United States Patent
Bashyam et al.

(10) Patent No.: US 12,521,057 B2
(45) Date of Patent: Jan. 13, 2026

(54) METHODS AND SYSTEMS FOR ASSESSMENT OF LIVER FIBROSIS AND STEATOSIS

(71) Applicant: Massachusetts Institute of Technology, Cambridge, MA (US)

(72) Inventors: Ashvin Bashyam, Austin, TX (US); Christopher Frangieh, Cambridge, MA (US); Michael J. Cima, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 310 days.

(21) Appl. No.: 17/496,879

(22) Filed: Oct. 8, 2021

(65) Prior Publication Data

US 2022/0110580 A1 Apr. 14, 2022

Related U.S. Application Data

(60) Provisional application No. 63/089,798, filed on Oct. 9, 2020.

(51) Int. Cl.
*A61B 5/00* (2006.01)
*G01R 33/50* (2006.01)
*G01R 33/563* (2006.01)

(52) U.S. Cl.
CPC ............ *A61B 5/4244* (2013.01); *G01R 33/50* (2013.01); *G01R 33/56341* (2013.01)

(58) Field of Classification Search
CPC . A61B 5/4244; G01R 33/50; G01R 33/56341
See application file for complete search history.

(56) References Cited

U.S. PATENT DOCUMENTS 10,162,031 B2 * 12/2018 Tunnicliffe ....... A61B 5/14546
10,228,432 B2 * 3/2019 Piechnik ............. G01R 33/543
(Continued)

FOREIGN PATENT DOCUMENTS

DE 102015226160 A1 6/2017
WO 2020219924 A1 10/2020

OTHER PUBLICATIONS

Karlsson; "Non-Invasive Characterization of Liver Disease by Multimodal Quantitative Magnetic Resonance"; Linköping University Medical Dissertations No. 1722, ISBN 978-91-7929-942-2, ISSN 0345-0082; 2019, pp. 1-77.*
(Continued)

*Primary Examiner* — Dixomara Vargas
(74) *Attorney, Agent, or Firm* — Eversheds Sutherland (US) LLP

(57) ABSTRACT

Methods for assessing steatosis and fibrosis in a patient's liver include (i) measuring a diffusion-weighted relaxometry signal of the liver, or portion thereof; and determining a fibrosis content of the liver or portion thereof based on the measured diffusion-weighted relaxometry signal, or (ii) measuring a relaxometry signal of the liver, or portion thereof; and determining a fat content of the liver or portion thereof based on the measured relaxometry signal. A system for such non-invasive sensing includes a static magnetic field source; RF transmitter coils connected to a pulse sequence generator; RF receiver coils configured to detect a magnetic field generated within liver tissues; and a signal acquisition and processor system configured to acquire signals from the RF receiver coils and perform a relaxation time (T2) relaxometry measurement, wherein the RF transmitter coils and pulse sequence generator are configured to apply a varying magnetic field to the liver tissues.

16 Claims, 25 Drawing Sheets

(56) References Cited

U.S. PATENT DOCUMENTS

| | | | | |
|---|---|---|---|---|
| 10,261,157 | B2* | 4/2019 | Sutton | G01R 33/56509 |
| 10,575,771 | B2* | 3/2020 | Banerjee | A61B 5/7282 |
| 10,845,446 | B2* | 11/2020 | Reeder | G01R 33/543 |
| 2007/0080685 | A1* | 4/2007 | Bydder | G01R 33/4816 |
| | | | | 324/309 |
| 2011/0028828 | A1* | 2/2011 | Daye | A61B 5/055 |
| | | | | 600/410 |
| 2011/0182815 | A1* | 7/2011 | Daich | A61K 49/14 |
| | | | | 424/9.1 |
| 2012/0003160 | A1* | 1/2012 | Wolf | A61B 5/055 |
| | | | | 424/9.3 |
| 2012/0019245 | A1* | 1/2012 | Reddy | G01R 33/5601 |
| | | | | 324/309 |
| 2014/0213887 | A1* | 7/2014 | Reddy | G01R 33/5605 |
| | | | | 600/414 |
| 2014/0232403 | A1* | 8/2014 | Perkins | G01R 33/4828 |
| | | | | 324/309 |
| 2015/0168322 | A1* | 6/2015 | Alocilja | G01R 33/28 |
| | | | | 435/7.1 |
| 2015/0309137 | A1* | 10/2015 | Bydder | G01R 33/34 |
| | | | | 324/309 |
| 2016/0120438 | A1 | 5/2016 | Cima et al. | |
| 2016/0139224 | A1* | 5/2016 | Assif | A61B 5/055 |
| | | | | 600/411 |
| 2017/0030986 | A1* | 2/2017 | James | G01R 33/4835 |
| 2017/0074952 | A1* | 3/2017 | Kantzas | G01R 33/0052 |
| 2017/0176549 | A1* | 6/2017 | Krapf | G01R 33/46 |
| 2017/0261584 | A1* | 9/2017 | James | G01R 33/4833 |
| 2017/0325710 | A1 | 11/2017 | Ryan et al. | |
| 2018/0220949 | A1* | 8/2018 | Prado | G01R 33/4828 |
| 2018/0306879 | A1 | 10/2018 | Bashyam et al. | |
| 2019/0076080 | A1 | 3/2019 | Prado | |
| 2020/0253501 | A1* | 8/2020 | Stadtler | G01R 33/3815 |
| 2021/0088614 | A1* | 3/2021 | Grimm | G16H 30/20 |
| 2021/0248741 | A1* | 8/2021 | Kannengiesser | A61B 5/055 |
| 2021/0364590 | A1* | 11/2021 | Roldán-Alzate | G01R 33/58 |
| 2022/0218221 | A1* | 7/2022 | Cima | A61B 5/4878 |
| 2022/0287635 | A1* | 9/2022 | Prado | A61B 5/4869 |
| 2022/0414972 | A1* | 12/2022 | Rohrer | G06T 15/08 |
| 2023/0148948 | A1* | 5/2023 | Prado | G01R 33/4828 |
| | | | | 600/421 |
| 2023/0168324 | A1* | 6/2023 | Gao | G01R 33/4818 |
| | | | | 324/309 |
| 2023/0168325 | A1* | 6/2023 | Gao | G01R 33/5616 |
| | | | | 324/309 |

OTHER PUBLICATIONS

Manuel Romero-Gomez; "NAFLD and NASH Biomarkers in Detection, Diagnosis and Monitoring"; ISBN 978-3-030-37172-2 ISBN 978-3-030-37173-9 (eBook); 2020; pp. 1-236.*
Xiaoke Wang; "Quantitative Magnetic Resonance Imaging Biomarkers for Diffuse Liver Disease": Technical Development and Validation; University of Wisconsin-Madison; 2019; pp. 1-136.*
Guimaraes et al.; "T2 relaxation time is related to liver fibrosis severity"; © Quantitative Imaging in Medicine and Surgery; Quant Imaging Med Surg 2016;6(2):103-114.*
Cassinotto et al.; "MR relaxometry in chronic liver diseases: Comparison of T1 mapping, T2 mapping, and diffusion-weighted imaging for assessing cirrhosis diagnosis and severity"; vol. 84, Issue 8, Aug. 2015, pp. 1459-1465.*
Ayse et al.; "Utility of diffusion-weighted imaging in the evaluation of liver fibrosis"; DOI 10.1007/s00330-011-2295-z; Eur Radiol (2012) 22:682-687 (Year: 2012).*
Leonie et al.; "Liver Fibrosis Quantification by Magnetic Resonance Imaging"; Topics in Magnetic Resonance Imaging vol. 26, No. 6, Dec. 2017 (Year: 2017).*
Laurence et al.; "Assessment of diffusion-weighted MR imaging in liver fibrosis"; Journal of Magnetic Resonance Imaging 25:122-128 (2007) © 2006 Wiley-Liss, Inc. 122 122-128 (Year: 2006).*
M. Freiman et al.; "Multi-class SVM model for fMRI-based classification and grading of liver fibrosis"; Article in Proceedings of SPIE—The International Society for Optical Engineering • Mar. 2010 (Year: 2010).*
Hanyu et al.; " Liver fibrosis staging with diffusion-weighted imaging: a systematic review and meta-analysis"; Springer Science+ Business Media New York; Abdom Radiol (2017) 42:490-501; DOI: 10.1007/s00261-016-0913-6 (Year: 2016).*
PCT International Search Report and Written Opinion for PCT Application No. PCT/US2021/054104 mailed Jan. 27, 2022 (15 pages).
Bashyam, A. et al., "Dehydration Assessment via a Non-Invasive, Miniature, Portable Magnetic Resonance Sensor using Multicomponent T2 Relaxometry" Magn. Reson. Med., 2019, 1-37.
Strauss, S. et al. "Interobserver and Intraobserver Variability in the Sonographic Assessment of Fatty Liver", American J. Roentgenology, 2007, 189(6): W320-W323.
Liang, W. et al., "Establishment of a General NAFLD Scoring System for Rodent Models and Comparison to Human Liver Pathology," PLoS ONE, 2014, 9(12): 1-17.
Shen, J. et al., "Non-Invasive Diagnosis of Non-Alcoholic Steatohepatitis by Combined Serum Biomarkers", J. Hepatology, 2012, 56(6), 1363-1370.
Krawczyk, K. et al. "Adipohormones as Prognostic Markers in Patients with Nonalcoholic Steatohepatitis", J. Physiology Pharmacology, 2009, 60(3), 71-75.
Loomba, R. et al., "Magnetic Resonance Elastography Predicts Advanced Fibrosis in Patients with Nonalcoholic Fatty Liver Disease: A Prospective Study," Hepatology, 2014, 60(6): 1920-1928.
Akkaya, H. E., et al., "Magnetic Resonance Elastography: Basic Principles, Technique, and Clinical Applications in the Liver", Diagnostic and Interventional Radiology, 2018, 24(6): 328-335.
Nakamura, A. et al., "Lessons from Mouse Models of High-Fat Diet-Induced NAFLD", International Journal of Molecular Sciences, 2013, 14(11): 21240-21257.
Bashyam et al., "Portable Single-Side MR: Multicomponent T2 Relaxometry and Depth Profiling with a Unilateral Linear Halbach Sensor", International Society for Magnetic Resonance in Medicine, 2018, 30 (1).
Araujo et al., "New Insights on Human Skeletal Muscle Tissue Compartments Revealed by In vivo T2 NMR Relaxometry", Biophysical Journal, 2014, 106(10): 2267-2274.
Ababneh et al., "Biexponential Parameterization of Diffusion and T2 Relaxation Decay Curves in a Rat Edema Model: Decay Curve Components and Water Compartments", Magnetic Resonance in Medicine, 2005, 54(3): 524-531.

* cited by examiner

METHODS AND SYSTEMS FOR ASSESSMENT OF LIVER FIBROSIS AND STEATOSIS

CROSS-REFERENCE TO RELATED APPLICATIONS

This application claims priority to U.S. Provisional Patent Application No. 63/089,798, filed Oct. 9, 2020, which is incorporated herein by reference.

STATEMENT REGARDING FEDERALLY SPONSORED RESEARCH AND DEVELOPMENT

This invention was made with government support under grant number P30 CA014051 awarded by the National Institutes of Health (NIH). The U.S. government has certain rights in the invention.

BACKGROUND

The present disclosure is generally in the field of medical diagnostics, including, but not limited to, non-invasive assessment of fibrosis and/or steatosis in a patient's liver, and more particularly portable magnetic resonance (MR) sensors and methods for liver tissue assessment.

Non-alcoholic fatty liver disease (NAFLD) and nonalcoholic steatohepatitis (NASH) together are the leading cause of chronic liver disease in the U.S. and together affect over 1 billion adults worldwide. It is estimated that 30 to 40% of U.S. adults have NAFLD with approximately 20% expected to progress to NASH. NAFLD is characterized by abnormal fat accumulation (steatosis) in the liver and, when it progresses to NASH, is defined by inflammation and varying degrees of fibrosis. There is no widely available, non-invasive diagnostic that can distinguish between patients with NAFLD and NASH. Such a measurement may allow earlier intervention, such as diet/lifestyle modifications, bariatric surgery, and pharmacologic therapies (e.g., pioglitazone, liraglutide) to prevent the progression from simple steatosis to steatohepatitis and, eventually, cirrhosis and hepatocellular carcinoma. These patients are also at higher risk of developing end-stage liver disease, for which the only cure is liver transplantation. Therefore, direct measurement of steatosis and fibrosis may provide a highly robust diagnosis, as there is a clinical need for improved diagnostic and prognostic technologies for liver conditions and diseases, such as NAFLD and NASH.

It would be desirable to provide new approaches that would enable more proactive screening of at-risk individuals before clinical symptoms become apparent, longitudinal tracking of disease progression to guide clinical interventions, and serve as a surrogate marker to support clinical development of new therapeutics. The ideal technology would be non-invasive, low-cost, sensitive, and specific, while offering both straightforward operation and an easily interpretable report.

Existing approaches have significant limitations: Liver biopsy is highly invasive and suffers from sampling bias; ultrasound suffers from high inter-operator variability and limited specificity; and serum markers are not specific to NAFLD and NASH and are only sensitive to severe disease. Magnetic resonance elastography (MRE) has shown promise in grading fibrosis in a clinical setting, but its high cost, driven by the need for specialized hardware, may limit widespread access similarly to MRI.

Magnetic resonance (MR) is exquisitely sensitive to changes in tissue architecture and composition induced by liver steatosis and fibrosis. A quantitative MRI scan is able to robustly extract clinically meaningful steatosis and fibrosis grades via multicomponent T2 relaxometry across a heterogeneous patient population with varied physiology and disease states. Its high cost, the large number of patients that need to be screened, requirement for a skilled operator and radiologist, long acquisition times, and limited accessibility, however, preclude use as a widely available diagnostic for highly prevalent liver diseases.

In sum, existing techniques for grading steatosis and fibrosis are expensive, require a skilled operator and radiologist, have long acquisition times, and limited accessibility. It therefore would be desirable to provide improved devices and methods for staging steatosis and fibrosis.

BRIEF SUMMARY

In one aspect, methods are provided for assessing fibrosis in a liver of a patient. According to some embodiments, the method includes (i) measuring a diffusion-weighted relaxometry signal of the liver or a portion thereof, and (ii) determining a fibrosis content of the liver or portion thereof based on the measured diffusion-weighted relaxometry signal. In some embodiments, the method is effective for use in the diagnosis of liver cirrhosis, hepatitis, alcoholic liver disease, or cholangitis, in the patient.

In another aspect, methods are provided for assessing steatosis in a liver of a patient. According to some embodiments, the method includes measuring a relaxometry signal of the liver or a portion thereof; and determining a fat content of the liver or portion thereof based on the measured relaxometry signal. In some embodiments, the method is effective for use in the diagnosis of nonalcoholic fatty liver disease (NAFLD) or nonalcoholic steatohepatitis (NASH) in the patient.

In still another aspect, diagnostic systems are provided which are configured for performing any one of the diagnostic methods. According to some embodiments, the system is configured to provide non-invasive sensing of fibrosis and/or steatosis in the liver of a patient. In some embodiments, the system includes (i) one or more magnets configured to provide a static magnetic field source; (ii) one or more RF transmitter coils connected to a pulse sequence generator which are configured to apply a varying magnetic field to liver tissues of the patient; (iii) one or more RF receiver coils configured to detect a magnetic field generated within the liver tissues of the patient; and (iv) a signal acquisition and processor system configured to acquire signals from the one or more RF receiver coils and perform a relaxation time (T2) relaxometry measurement.

BRIEF DESCRIPTION OF THE DRAWINGS

FIG. 3A estimates fat amplitude versus steatosis grade. FIG. 3B shows ROC of classifiers between steatosis grades. FIG. 3C is a confusion matrix of predicted versus true steatosis.

FIG. 4A is an illustration of depth profiling indicating scanning of a planar sample along the depth ($\Delta z$) axis above the sensor. FIG. 4B shows acquired depth profiles at 11.43 MHz and 11.66 MHz RF excitation frequency, a scaled depth profile at 11.66 MHz, and a differential depth profile derived as the weighted difference between the two acquired depth profiles. FIG. 4C is an illustration of a depth-resolved fat phantom experiment with proximal (constant fat fraction) and distal (varied fat fraction) synthetic tissue layers. FIG. 4D shows estimated fat amplitude. FIG. 4E estimates fat amplitude versus steatosis grade. FIG. 4F shows ROC of classifiers between steatosis grades. FIG. 4G is a confusion matrix of predicted versus true steatosis.

FIG. 7A depicts steatosis. FIG. 7B depicts fibrosis.

FIG. 3A estimates fat amplitude versus steatosis grade. FIG. 3B shows ROC of classifiers between steatosis grades. FIG. 3C is a confusion matrix of predicted versus true steatosis.

FIG. 10A is a schematic to characterize the sensitivity profile versus depth. FIG. 10B shows sensitivity of the sensor as a function of sample depth (referenced to the top of the RF coil) and RF excitation frequency shows that tuning the RF pulse frequency allows for adjustable sensitivity along the depth axis.

FIG. 10C shows the projection of each curve onto the depth axis shows an RF pulse bandwidth of ~0.7% excites slices 0.6 to 1.3 mm thick with slice thickness decreasing further from the surface of the sensor.

FIG. 12A is a schematic showing planar proximal tissue and target tissue samples on top of portable MR sensor. FIG. 12B is a schematic illustrating the use of the depth sensitivity profiles (referenced to the top of the RF coil) to estimate the thickness of a tissue layer. FIG. 12C depicts experimentally measured and predicted target tissue signal fractions from each unique proximal tissue thickness versus RF excitation frequency. FIG. 12D depicts thickness estimation error versus predicted thickness for each unique proximal tissue thickness.

DETAILED DESCRIPTION

Figure 1A:
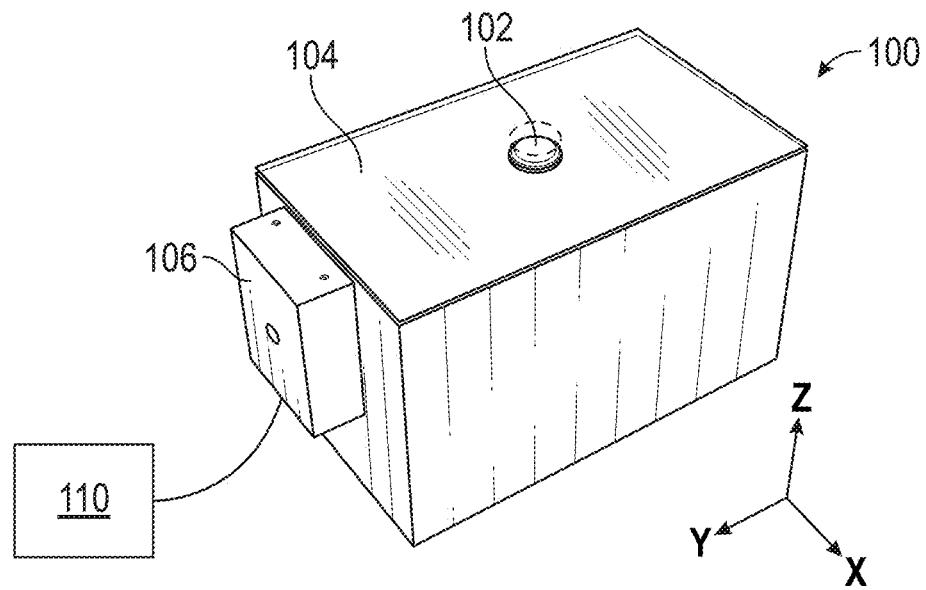
FIG. 1A depicts an embodiment of the portable magnetic resonance sensor described herein.

It has been discovered that T2 relaxometry can provide remarkable accuracy across a wide range of steatosis and fibrosis levels, thereby supporting the concept that T2 relaxometry can provide the necessary sensitivity to detect steatosis and/or fibrosis within a point-of-care, fully automated, low-cost and noninvasive MR-based platform. It was surprisingly discovered that this technology can be used to separate changes in fibrosis from changes in fat content using the combined power of multicomponent and diffusion-weighted scans.

In one aspect of the present disclosure, methods are provided for assessing fibrosis in a liver of a patient. The method includes (i) measuring a diffusion-weighted relaxometry signal of the liver or a portion thereof, and (ii) determining a fibrosis content of the liver or portion thereof based on the measured diffusion-weighted relaxometry signal. In some embodiments, the method is effective for use in the diagnosis of liver cirrhosis, hepatitis, alcoholic liver disease, or cholangitis, in the patient.

The measuring in these methods for assessing fibrosis preferably includes use of one or more permanent magnets configured to enable a single-sided NMR measurement. For example, the one or more permanent magnets may be in the form of a unilateral linear Halbach array of permanent magnets. The determining in these methods for assessing fibrosis preferably includes use of one or more RF coils and a processor which are configured to produce multicomponent diffusion-weighted T2 relaxometry measurements to assess the fibrosis content.

In another aspect of the present disclosure, methods are provided for assessing steatosis in a liver of a patient. The method includes (i) measuring a relaxometry signal of the liver or a portion thereof, and (ii) determining a fat content of the liver or portion thereof based on the measured relaxometry signal. In some embodiments, the method is effective for use in the diagnosis of nonalcoholic fatty liver disease (NAFLD) or nonalcoholic steatohepatitis (NASH) in the patient.

The measuring in these methods for assessing steatosis preferably includes use of one or more permanent magnets configured to enable a single-sided NMR measurement. For example, the one or more permanent magnets may be in the form of a unilateral linear Halbach array of permanent magnets. The determining in these methods for assessing steatosis preferably includes use of one or more RF coils and a processor which are configured to produce depth-resolved, multicomponent T2 relaxometry measurements to assess the fat content.

In various embodiments of these methods, the (T2) relaxometry measurements may be used to assess fat content or fibrosis content of the liver in a patient. This assessment may be a quantitative or semi-quantitative. For example, the measurements may be clinically useful even when the measurement readout yield is 'semi-quantitative' and only able to bin steatosis or fibrosis grade into a finite number of distinct buckets (e.g., high, medium, low).

In some embodiments of these methods, the patient may be a human. In some other embodiments, the patient may be another mammal, for example for use in veterinary diagnostics.

In another aspect of the present disclosure, diagnostic system are provided which are configured for performing any of one of the foregoing methods. Systems are provided for non-invasive sensing of fibrosis and/or steatosis in the liver of a patient. In some embodiments, the system includes (i) one or more magnets configured to provide a static magnetic field source; (ii) one or more RF transmitter coils connected to a pulse sequence generator which are configured to apply a varying magnetic field to liver tissues of the patient; (iii) one or more RF receiver coils configured to detect a magnetic field generated within the liver tissues of the patient; and (iv) a signal acquisition and processor system configured to acquire signals from the one or more RF receiver coils and perform a relaxation time (T2) relaxometry measurement. In some embodiments, the magnetic field source is a magnetic field that is uniform. For example, the magnetic field may be uniform to within 1% field uniformity. In some embodiments, the RF transmitter coils have a frequency range from 1 MHz to 50 MHz, for example from 100 kHz to 20 MHz. In some embodiments, the system is configured to provide one or more of (i) multicomponent T2 relaxometry, (ii) measurement localization by RF excitation frequency tuning, and (iii) diffusion weighting by varying echo time.

The system may be configured to measure fibrosis only, steatosis only, or both steatosis and fibrosis together. In some embodiments, the system is configured to: use a CPMG pulse sequence to produce MR signals; decompose the MR signals to identify constituent relaxation times and their corresponding amplitudes; and determine a fat fraction of the liver using the relaxation times and their corresponding amplitudes. In some embodiments, the system is configured to: use a CPMG pulse sequence to produce MR signals; decompose the MR signals to identify constituent relaxation times and their corresponding amplitudes; and determine a fibrosis fraction of the liver using the relaxation times and their corresponding amplitudes.

The methods and systems described herein may be used in the diagnosis of liver conditions and diseases, including but not limited to cirrhosis, hepatitis, alcoholic liver disease, and cholangitis, as well as for assessing liver health for liver transplants and diagnosis of NAFLD and NASH.

In preferred embodiments of the methods and systems described herein, a portable magnetic resonance sensor is implemented as a point-of-care diagnostic tool for staging liver steatosis and fibrosis. These methods and systems advantageously may enable broad availability of low-cost staging and monitoring, e.g., for disease progression from NAFLD to NASH, which beneficially would allow for earlier diagnosis, more accurate patient stratification, and more straightforward evaluation of investigational therapies. The system of such a portable magnetic resonance sensor preferably includes a depth-resolved, diffusion-weighted, single-sided MR device. However, the diffusion-weighted aspect of the measurement is not required in order to perform a useful measurement of steatosis. Use of these MR methods and systems can yield accurate staging of steatosis and fibrosis. A portable MR sensor for steatosis and fibrosis grading advantageously leverages the diagnostic power of MRI while overcoming many of the shortcomings of both MRI and existing approaches to NASH/NAFLD diagnostics.

As detailed in the examples herein, accurate staging of steatosis and fibrosis has been demonstrated in mouse and human livers using a portable MR sensor with histological validation. This approach leverages diffusion-weighted multicomponent T2 relaxometry to provide a quantitative predictor of both steatosis and fibrosis. The sensor has the ability to robustly quantify steatosis grade via synthetic tissue phantoms. The portable MR sensor was used to stage steatosis and fibrosis both ex vivo and in vivo in a mouse model of NAFLD/NASH. This was validated with human liver tissue samples.

An ideal diagnostic biomarker for NAFLD and NASH would be highly specific and sensitive, low-cost, non-invasive, automated, and portable to enable longitudinal monitoring of disease progression. The devices and methods disclosed herein demonstrated a portable MR system capable of i) accurately identifying liver steatosis and fibrosis in excised mouse liver, ii) localizing its measurement towards a distal region to avoid more proximal confounding tissues, and iii) accurately identifying liver steatosis within mice in vivo and within human liver tissue. A portable MR sensor may be capable of improving screening of at-risk individuals, enabling longitudinal tracking of disease progression to guide clinical interventions, and aiding in the development of novel therapeutics.

Traditional MRI has demonstrated highly accurate quantification and liver steatosis and fibrosis. MRI is, however, unsuitable for routine use due to its high cost, long measurement time, and requirements for dedicated operators and facilities. The MR sensor and methods disclosed herein offers the potential to leverage the versatility of MRI within a portable (7 kg), compact, low power consumption platform. The device is straightforward to deploy and requires no skilled operator for data acquisition or measurement interpretation, thus eliminating the cost associated with radiologist interpretation of MRI data. A cost effectiveness analysis found that a low-cost MR-based technique would be superior to liver biopsy.

A major advantage of a portable MR sensor is its ability to efficiently sample a large volume of liver in a single measurement. Liver biopsy core samples represent only ~1/50,000th of the total liver volume, which introduces sampling variation. Sampling bias is especially relevant in NAFLD where substantial heterogeneity has been reported. Liver biopsies are associated with pain, organ injury, bleeding, and death. Patient attrition is high in investigational studies requiring regular liver biopsy, which precludes longitudinal sampling. An imaging-based approach, such as the one described here, has the potential to sample the entire liver volume overcoming the most significant limitation of liver biopsy (i.e. spatial sampling bias) as well as reducing/eliminating patient discomfort, injury, and bleeding.

This measurement directly interrogates the accumulation of fat and progression of fibrosis. Blood sampling, although it is relatively non-invasive and offers a convenient method for repeated assessment of liver function, measures liver specific markers. Liver specific markers (e.g. alanine aminotransferase, aspartate aminotransferase, alkaline phosphatase, gamma glutamyl transpeptidase, bilirubin) offer neither a highly specific nor sensitive method for identifying NAFLD onset or progression. Direct measurement of steatosis and fibrosis offers a potentially more accurate estimate of disease onset and progression. The approach disclosed herein is potentially complementary to MRE, as it offers an estimate of fibrosis based on microstructural changes in water compartmentalization whereas MRE focuses on macroscopic changes in tissue stiffness. This approach may be used in diagnosis and longitudinal tracking of liver tumors and hepatic iron overload.

High fat and nutrient deficient diet-induced mouse models of liver steatosis and fibrosis for NAFLD and NASH are ubiquitous and well accepted. These models faithfully reproduce relevant pathophysiology seen in human disease including progressive microvesicular and macrovesicular steatosis and periportal and perisinusoidal fibrosis. Furthermore, these models induce increased expression of genes associated with lipogenesis, inflammatory cytokines, oxidative stress, and serum liver enzyme activity. Hepatocellular ballooning and lobular inflammation, key hallmarks of NAFLD and NASH progression, are unable to be independently assessed, as their presence is highly correlated with that of steatosis in this mouse model.

A portable MR sensor can also have significant diagnostic utility for surgeons who perform liver transplant or hepatic resection. Moderate and severe steatosis (e.g. >30% macrosteatosis) are independent risk factors during liver transplantation for significant morbidity, including risk of immediate nonfunction, need for renal replacement therapy, early allograft dysfunction, and decreased patient survival. Current methods for screening for liver steatosis, particularly in cases of donation after circulatory death, are subjective and inaccurate which leads to excessive liver discards, further exacerbating the organ shortage. A noninvasive measure of liver steatosis, as described herein would enable widespread screening of candidate livers prior to transplantation to allow for informed selection of deceased donors as well as improved screening of living donors. In addition, an objective measure of steatosis would assist with preoperative preparation for hepatic liver resection. Patients with hepatic steatosis undergoing partial hepatectomy have significantly higher postoperative morbidity compared to those without steatosis, which is attributable to severe ischemia-reperfusion injury during resection and impaired parenchymal regeneration thereafter. There is a clear need for prompt, point-of-care assessment of liver steatosis to enable transplant surgeons to make objective decisions about organ utilization.

A non-invasive MR device capable of isolating its measurement to liver tissue requires a localization technique that performs well across heterogeneous patients. In the examples herein, the in vivo measurements of liver steatosis may have been confounded by more proximal fat located in the intraperitoneal or subcutaneous space, especially in mice with higher body weight. The geometrical design of the sensor can be modified to improve the spatial selectivity of the measurement. Efforts to increase the penetration depth of the device to enable a robust in vivo measurement of human liver tissue would likely increase mass and, therefore, may partially compromise portability compared to the sensor used in the examples. However, prior experience testing a portable MR sensor in a hospital setting shows that a device mounted on a cart provides a suitable form-factor for point-of-care diagnostics. Despite these modest increases in sensor mass, the cost and portability would remain substantially improved over clinical MRI and this would result in improved access to diagnostic tests performed with this sensor in both hospital and outpatient settings. It may be useful to consider an optimal balance among penetration depth, magnetic field strength, and sensor portability. Design modifications of single-sided sensors, may help to achieve penetration depths of several centimeters without excessively compromising portability. The pulse sequences and signal processing techniques described here are expected to generalize to single-sided sensors designed via alternative approaches beyond the Unilateral Linear Halbach array. More sophisticated acquisition strategies may be implemented through novel pulse sequence design to efficiently map the relevant anatomy and isolate the signal originating from the liver.

Methods and Systems

The portable MR sensor can identify fat and fibrosis content of an organ, such as a liver, despite the presence of a confounding signal from proximal subcutaneous tissue. This is achieved by localizing the signal via tuning of the RF excitation frequency and by isolating the signal via diffusion-weighted measurements and T2 multicomponent relaxometry.

The portable MR sensor can measure fibrosis within a liver using a diffusion-weighted measurement of fluid within the liver tissue. Multicomponent T2 relaxometry allows identification of the signal attributed to each of the fluid compartments within the liver: intracellular water, extracellular water, and fat.

In cases of moderate subcutaneous tissue thickness, increased penetration depth offered by varying the RF excitation frequency may serve to localize the measurement completely within the liver tissue. In circumstances where the subcutaneous thickness is more substantial and localization by tuning the RF excitation frequency is insufficient, a diffusion-weighted measurement can help identify changes in the signal that are associated with fluid shifts.

The techniques described here utilize a diffusion-weighted (DW) liver signal, the difference in the amplitude of the extracellular fluid component at a short (65 us) and long (520 us) echo time, to assess liver fibrosis because the DW liver signal correlates with fibrosis and is different between fibrosis grades. The combination of depth-resolved, diffusion-weighted multicomponent T2 relaxometry can enable a portable, single-sided MR sensor to measure fat fraction and diagnose liver diseases such as NAFLD and NASH. These techniques can be applied to provide a non-invasive measure of liver fat fractions and fibrosis in humans despite highly variable subcutaneous tissue thickness. This approach may ultimately serve as a real-time, point-of-care indicator of fatty liver diseases.

In some particular applications of the present systems and methods, the sensor system is adapted to assess fat content of a patient's liver in order to determine whether the patient has NAFLD or NASH, and then to treat the patient, if necessary, e.g., by diet/lifestyle modifications, bariatric surgery, and pharmacologic therapies (e.g., pioglitazone, liraglutide). In some other particular applications, the sensor device is adapted to assess fibrosis of a patient's liver in order to determine whether the patient has liver cirrhosis, hepatitis, alcoholic liver disease, or cholangitis, and then to treat the patient as indicated.

"Magnetic field generated by sample" means magnetic resonance relaxation of the sample following excitation induces a magnetic field that is measured by the RF receiver coil.

"Applied varying magnetic field" means the magnetic field produced by the RF transmitter coil to excite the sample under measurement.

"Static magnetic field" refers to the constant magnetic field created by either a permanent magnet geometry or a superconducting material. It polarizes the spins within the sample.

"Static magnetic field source" refers to the source of the static magnetic field, which is either a permanent magnet geometry or a superconducting material.

"RF transmitter coil" can be separate from or combined with an RF receiver coil and is responsible for applying a time varying magnetic field to excite the sample under measurement. One or more of these coils may be used in the present systems and methods.

"RF receiver coil" can be separate from or combined with an RF transmitter coil and responsible for measuring relaxation of the sample following excitation. One or more of these coils may be used in the present systems and methods.

"Signal acquisition system" refers to any system that digitizes the analog output of the RF receiver coil.

"Signal processing" refers to all processing of digital signal output by signal acquisition system. This includes but is not limited to averaging, denoising, and signal modulation.

"Feature extraction" refers to any fitting or modeling of the processed signal. Extraction of the relevant parameters of the fitting.

"Pulse sequence generator" controls the RF transmitter coil. It outputs a pulse sequence that is translated into an applied time-varying magnetic field created by the RF transmitter coil.

In some embodiments, the present MR systems and methods, including operating systems therefor, are adapted to apply new acquisition strategies to more efficiently and specifically identify the fibrosis and/or fat content of liver tissues. The ultimate goal of these sensor systems and methods may be to detect fatty tissue liver diseases or fibrotic liver diseases. In some embodiments, the sensor systems focus on multicomponent T2 relaxometry, because it provides a tractable design goal for an MR system, is straightforward to relate to physical changes in fluid distribution, and is amenable to efficient MR acquisition strategies. In some other embodiments, the sensor systems may use both traditional pulse sequences outside of CPMG, as well as other approaches based on compressed sensing, dictionary-based approaches, and adaptive acquisition strategies.

For example, additional parameters of interest for new acquisition strategies include T1, proton density, diffusivity, and magnetization transfer. Although there are well established pulse sequences available to interrogate these properties with single sided MR systems, they may need to be adapted to provide suitable acquisition times and sensitivity for the present methods.

Multidimensional NMR, for example, may be used to establish/characterize a relationship between two or more of these MR parameters. This increased specificity towards fluid compartments could allow for improved characterization of each of their distinct MR properties; however, these multidimensional NMR techniques should be adapted to provide clinically useful acquisition times. For example, there are some known approaches in magnetic resonance that rely upon sparsely sampling parameter space and highly regularized reconstruction, which may provide highly accelerated multidimensional measurements. These techniques rely on the fact that the signal generated by a magnetic resonance sensor redundantly represents data when transformed into particular domains or bases.

In some embodiments, a dictionary-based approach may be used with a single sided portable MR sensor to identify fat fraction. First, a dictionary would be created which represents the expected signal produced by a sample at various fat fractions when interrogated with a particular pulse sequence by an MR sensor. This dictionary would rely on knowledge of the geometry of the sensor and the expected MR parameters of the tissue. The particular pulse sequence could be generated by a random process or could be designed to extract maximal information from the sample. The sensor would then be used to perform the measurement of the sample using that particular pulse sequence. The signal that is acquired would be compared to the simulated signals within the dictionary. The simulated signal from the dictionary that matches the acquired signal would correspond to the best approximation of the MR parameters and/or fat fraction of the tissue. This technique could be extended to include multiple pulse sequences. This technique may be applied iteratively or adaptively so that early measurements provide a coarse approximation of the MR parameters and/or fat fraction of the tissue, while later measurements provide a finer approximation. This may result in a more robust or more efficient acquisition strategy. Thus, the methods and portable, non-invasive sensors of fat content described herein can aid in diagnosis of liver disease, including non-alcoholic fatty liver disease (NAFLD) and nonalcoholic steatohepatitis (NASH), and inform therapeutic decisions across diverse patient populations.

In some embodiments of the present systems and methods, the sensor is a single-sided MR sensor based on the Unilateral Linear Halbach magnet design. This design enables high sensitivity, and remote MR measurements via compact permanent magnet array. This sensor is capable of performing depth-resolved measurements by tuning the RF excitation frequency. Quantification of the relative fractions of tissues within heterogeneous samples may be obtained via multicomponent T2 relaxometry. The sensor exhibits contrast dependent on the diffusivity of the sample. This capability is leveraged to isolate and characterize tissues with otherwise similar MR relaxation properties. These techniques may then be applied in combination to provide a depth-resolved, diffusion-weighted, multicomponent T2 relaxometry measurement.

The portable MR sensor of the present methods and systems may provide measurement use of one or more permanent magnets configured to enable a single-sided NMR measurement. The one or more permanent magnets may comprise a unilateral linear Halbach array of permanent magnets. For example, the portable MR sensor of the present methods and systems may be realized through the use of a Unilateral Linear Halbach magnet geometry. Briefly, this sensor may comprise an array of 180 permanent magnets arranged to produce a static magnetic field (0.28 Tesla) with <2% field variation over a volume spanning approximately 12×6×6 mm.

Bashyam, A., Frangieh, C., Li, M. & Cima, M. J. "Dehydration assessment via a non-invasive, miniature, portable magnetic resonance sensor using multicomponent T2 relaxometry." *Magn. Reson. Med.* (2019), incorporated herein by reference, provides detailed descriptions of the design, construction, and characterization of one particular MR sensor which is suitable for use the present methods and systems. The magnets may be configured as described in U.S. Patent Application Publication No. 2018/0306879, entitled "Single-Sided Magnets for Remote Nuclear Magnetic Resonance Measurements" by Bashyam, et al.

These innovations enable miniaturized, single-sided MR sensors to perform measurements of fat fraction in the liver. This non-invasive, portable, point of care technique has the potential to help diagnose and manage conditions involving fat content such as NAFLD and NASH.

The portable MR sensor of the present methods may be configured for increased sensitivity. For example, the sensor may include a larger magnet design that would straightforwardly allow for increased penetration depth. Further optimization of the Unilateral Linear Halbach array may provide increases in penetration depth. In some embodiments, the sensor may include a series of magnets provided with curvatures matched to that of the range of anatomy expected in a target patient population. Alternatively, in some embodiments, the sensor may include a deformable magnet geometry that allows a single magnet to adapt to the anatomy of each patient. The geometry could be unilateral or circular to allow for more precise design of the field profile and strength at the tissue of interest.

In some embodiments, the magnet includes adjustment shims, operable to compensate for minor imperfections in the magnetization of the constituent permanent magnets. This may result in increased field homogeneity, an increased T2* and ultimately higher sensitivity measurements. In some embodiments, the magnet is fabricated from a few very large permanent magnets to increase the density of magnetic material within the housing. In some embodiments, shimming is tunable in real-time to allow for shimming of the main magnetic field during scanning. This may provide precision tuning of the sensor sensitive region based on patient physiology, patient disease status, or environmental confounders.

In some embodiments, the sensor includes the ability to adjust its excitation and acquisition frequency with minimal latency and user interaction. In one embodiment, the matching circuit requires manual adjustment when the RF frequency is changed since it only provides a very narrowband match. In a more preferred embodiment, however, the sensor includes a circuit configured to provide either the ability for a broadband match across a wider range of frequencies or the ability to be rapidly tuned in an automated fashion.

In some embodiments, the sensor includes gradient encoding coils to enable stronger diffusion-weighted acquisition. Existing single sided sensors typically rely on the gradient within the static magnetic field. This provides limited control over the magnitude of diffusion encoding and no control over its direction.

In some embodiments, the sensor includes multiple coils, either separate transmit and receive coils or multiple transceiver coils. Multiple transceiver coils may allow for parallel acquisition of a single patient at different points along their physiology. Parallel scanning of patients will allow for decreased acquisition time without a loss of signal.

In some embodiments, the portable, single-sided MR sensor is configured to use the combination of three techniques—multicomponent T2 relaxometry, measurement localization by tuning RF excitation frequency, and diffusion weighting by varying echo time. Variations of each of these techniques may also be used.

In some embodiments, the devices and operating methods described herein utilize, or are adapted from, the measured relaxation parameters and methods for measuring relaxation parameters described at U.S. Patent Application Publication No. 2016/0120438.

In some embodiments, the contribution from each tissue is identified to isolate the signals of interest and permit further analysis of their relaxation properties. That is, the identification of tissue fractions are derived from an MR signal acquired with the portable MR sensor. This may be accomplished using an algorithm to estimate the fraction of tissues within the hybrid signal through an iterative approach that minimizes the error between the measured signal and a synthetic signal based on an estimated ratio of constituent tissues. For example, the algorithm may recover the fractions of muscle and fat within the hybrid signal to within a 2% error or better. The technique could be extended to consider multiple signals from each constituent tissue in order to improve its robustness, especially towards complex samples. Two measurements could be performed with different sensitivities towards spin diffusivity, for example, for each constituent tissue and for the hybrid sample. The addition of the second signal would increase the orthogonality of the basis signals, if the constituent samples have differences in diffusivity, and, therefore, may increase the accuracy and/or robustness of the technique in the presence of noise or other confounding signals. This same approach could also be applied with other pulse sequences (e.g. inversion recovery, saturation recovery, stimulated echoes, pulsed gradient echo, etc.) to take advantage of differences in T1, T2, and/or diffusivity in combination.

This technique can be extended towards more than two tissues by allowing the algorithm to consider the weighting of an arbitrary number of constituent, or basis, signals. The technique can also be made more general by replacing the use of a multi-exponential basis with any other basis.

In order to improve the robustness of this technique, especially towards complex samples, it could be extended to consider multiple signals for each constituent tissue. For example, two measurements could be performed with different sensitivities towards spin diffusivity for each constituent tissue and for the hybrid sample. If the constituent samples have differences in diffusivity, then the addition of the second signal increases the orthogonality of the basis signals and, therefore, may increase the accuracy and/or robustness of the technique in the presence of noise or other confounding signals. This same approach may also be applied, potentially with other pulse sequences (e.g., inversion recovery, saturation recovery, stimulated echoes, pulsed gradient echo, etc.) to take advantage of differences in T1, T2, and/or diffusivity in combination.

The methods and portable, non-invasive sensors of fat content described herein can aid in diagnosis of liver disease, including non-alcoholic fatty liver disease (NAFLD) and nonalcoholic steatohepatitis (NASH), and inform therapeutic decisions across diverse patient populations. In some embodiments, the device is a single-sided MR sensor device which can provide a portable, low-cost platform for localized MR measurements.

The present invention may be further understood with reference to the following non-limiting examples.

Example 1: Device Design and Measurements

Figure 1B:
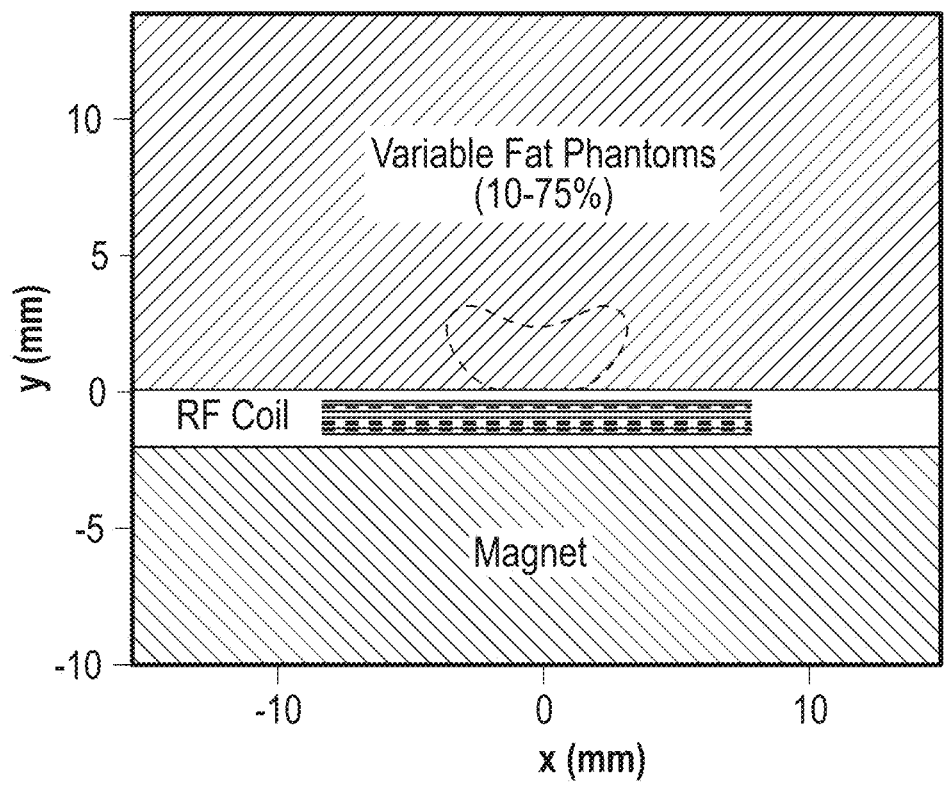
FIG. 1B is a schematic for quantification of fat fraction within synthetic tissue phantoms of variable fat content, according to one example.
Figure 1C:
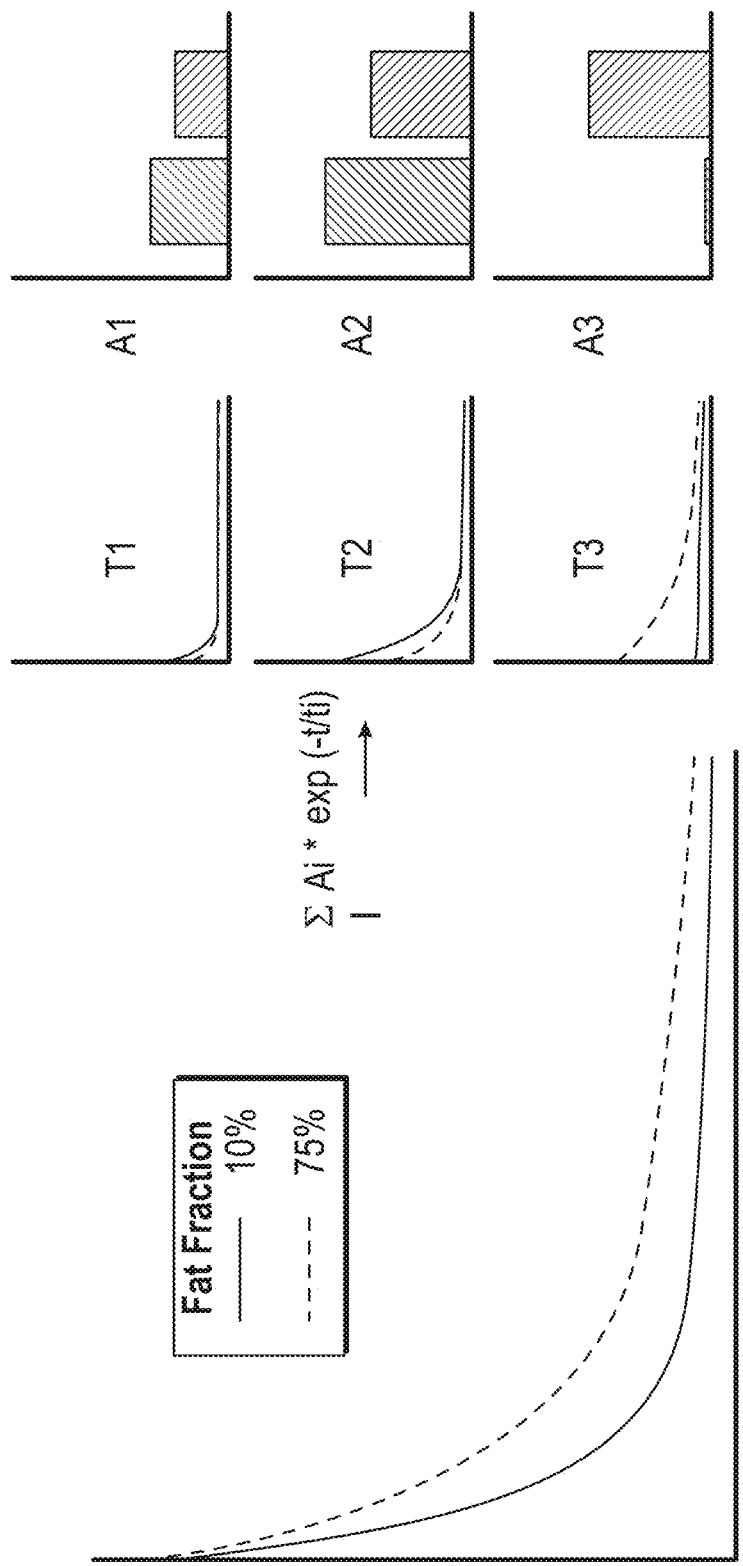
FIG. 1C is a schematic of signal decomposition for multicomponent T2 relaxometry data analysis technique.
Figure 1D:
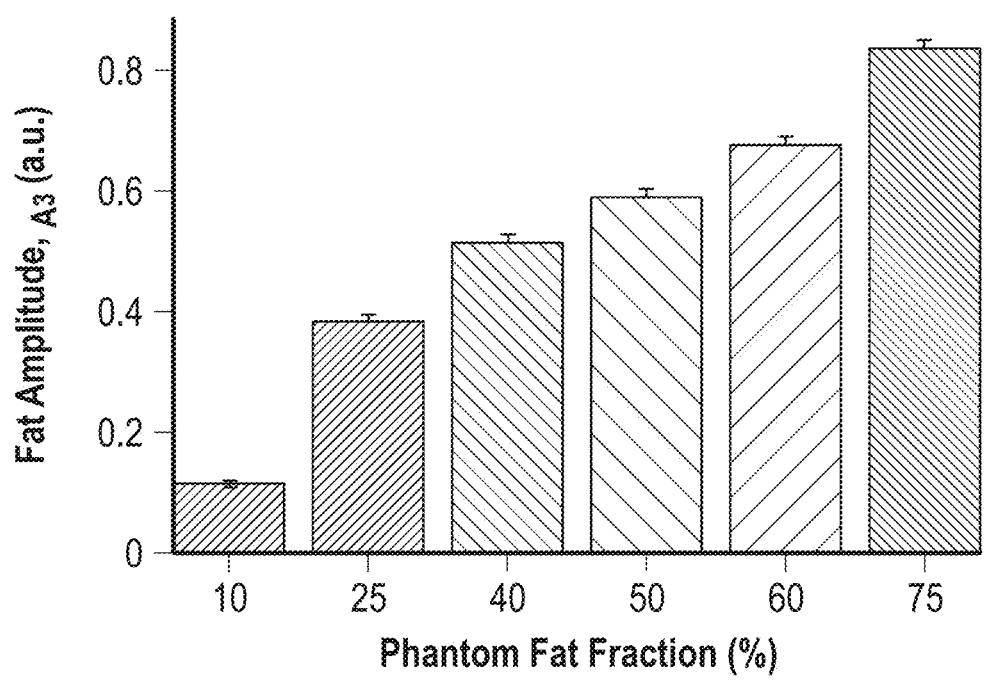
FIG. 1D shows fat amplitude extracted from portable MR sensor measurements of synthetic tissue phantoms.

It was determined that multicomponent T2 relaxometry localized to the liver via a portable MR sensor could identify and accurately stage steatosis and fibrosis for use as a diagnostic of NAFLD and NASH. FIG. 1A is an illustration of a portable single-sided MR sensor, according to one embodiment. The sensor 100 comprises a measurement region 102, a housing 104, electronics housing 106 containing an impedance matching circuit, and an electrical connection to the signal acquisition and processor system 110. The housing 104 contains one or more magnets (not visible here) configured to provide a static magnetic field source. The RF electronics within the electronics housing 106 may be configured as a broadband matching circuit to provide broadband match across a wide range of frequencies or rapid, automated tuning. The measurement region 102 includes one or more RF transmitter coils connected to a pulse sequence generator which are configured to apply a varying magnetic field to tissues of the patient and/or one or more RF receiver coils configured to detect a magnetic field generated within tissues of the patient. The RF transmitter coil and the RF receiver coil may be the same physical coil, or they may be two distinct coils. These coils may be either spatially coincident or can take on different geometries, shapes, and/or positions. More details about the structure of the portable MR sensor 100 may be found in PCT Publication No. WO 2020/219924, which is incorporated herein by reference. FIG. 1B is a schematic for quantification of fat fraction within synthetic tissue phantoms of variable fat content. Accurate fat fraction quantification was demonstrated with synthetic tissue phantoms using this approach. Liver steatosis and fibrosis can then be measured using the portable MR sensor by leveraging differences in compartmental T2 relaxation rate and diffusivity. FIG. 1C is a schematic of signal decomposition for multicomponent T2 relaxometry data analysis technique. $A_i$ and $\tau_i$ correspond to the amplitude and relaxation time, respectively, for a particular relaxation component. Time domain decay curves (not shown) were acquired with the portable MR sensor for each synthetic tissue phantom. FIG. 1D shows fat amplitude extracted from portable MR sensor measurements of synthetic tissue phantoms. Error bars represent 95% confidence intervals on amplitude estimates.

This technique was applied to grade steatosis in mice and in human liver samples. MR feature extraction and analysis methods were prospectively determined. Sample sizes were determined with power calculations based on effect sizes estimated from pilot experiments. No outliers were excluded from data analysis. Investigators were blinded to the identity of mice during measurement, data analysis, and pathology grading.

The sensor employed contained a magnet assembly, based on the Unilateral Linear Halbach design, and a solenoid RF transceiver coil. The magnet assembly produces a remote, uniform static magnetic field that, in combination with the RF transceiver coil, is capable of performing a measurement distal from the surface of the sensor.

Synthetic tissue phantoms were synthesized spanning a wide range of fat fractions (10% to 75% fat) consisting of emulsions of peanut oil and agar hydrogel. Microscopy images of phantoms (not shown) confirmed the presence of emulsified oil droplets contained within the hydrogel matrix. These phantoms emulated the range of fat fractions observed in healthy and fatty human liver and exhibit similar MR relaxation properties observed in these tissues. The relaxation times and relative amplitudes of low and high fat phantoms showed high concordance with those of low and high steatosis mouse livers, respectively (not shown). Each phantom was measured with the portable MR sensor via a CPMG pulse sequence to perform multicomponent T2 relaxometry. Samples were placed directly adjacent to the RF transceiver coil and fully spanned the sensitive region of the sensor (FIG. 1B).

The acquired signal was processed to infer a quantitative metric of fat content. The MR signals were decomposed using a multi-exponential model to identify constituent relaxation times and their corresponding amplitudes (FIG. 1C). The amplitude attributed to a particular relaxation time is a direct measure of the composition of the sample. The time-domain relaxometry signals show an increase in relaxation time with increasing fat fraction. These synthetic tissue phantoms and liver tissue produce multicomponent T2 decay signals due to the presence of multiple distinct water compartments (e.g. intracellular vs. extracellular).

Figure 5:
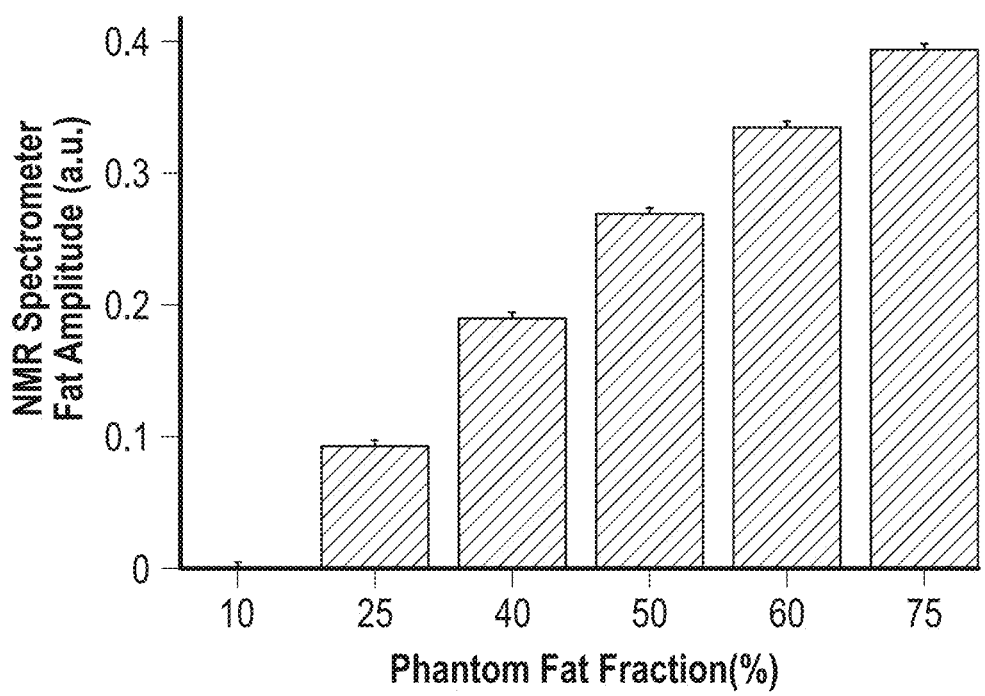
FIG. 5 depicts fat amplitude extracted from a benchtop NMR spectrometer, according to one example.

The slowest relaxation component corresponds to the fat compartment in these synthetic tissue phantoms. The amplitude attributed to the fat compartment from portable MR sensor measurements is directly related to the phantom fat fraction as expected (FIG. 1D). Similar results were acquired when phantoms are measured with a benchtop NMR spectrometer, which serves as a gold-standard for T2 relaxometry measurement (FIG. 5). FIG. 5 shows fat amplitude extracted from benchtop NMR spectrometer (relaxometry gold standard) via T2 relaxometry measurements of synthetic tissue phantoms. Error bars represent 95% confidence intervals.

The benchtop NMR spectrometer could not serve as a viable clinical diagnostic due to its small closed bore design and limited portability. In addition, this fitting procedure is able to robustly estimate amplitudes of distinct tissue compartments across a range of heterogenous tissue samples. Monte Carlos simulations were performed to establish the necessary signal-to-noise ratio for accurate tissue amplitude estimation. These findings show that the sensor described herein can quantify fat fraction using multicomponent T2 relaxometry.

Example 2: Murine Model

Liver steatosis and fibrosis was induced within a mouse model of NAFLD and NASH progression. High fat and nutrient deficient diet-induced mouse models faithfully reproduce relevant pathophysiology seen in human disease, including progressive microvesicular and macrovesicular steatosis and periportal and perisinusoidal fibrosis. Mice were randomly assigned to one of four diets: low fat (LF), a standard chow with no nutrient deficiency; low fat amino acid defined (LFAA); high fat amino acid defined (HFAA); and high fat amino acid defined methionine and choline deficient (HFAAMCD). The high fat diets (HFAA and HFAAMCD) contained 61% calories from fat whereas the low fat diets (LF and LFAA) contained between 14 and 10% calories from fat, respectively. The HFAAMCD diet contained no choline and an approximately six-fold reduction in methionine from normal levels. The four diets are detailed in Table 1:

TABLE 1

| Diet | HFAAMCD | HFAA | LFAA | LF |
|---|---|---|---|---|
| Vendor, product number | Research Diets, A06071302 | Research Diets, A06071306 | Research Diets, A06071314 | LabDiet, Prolab Isopro RMH 3000 (5P76) |
| Summary | 60 kcal % fat, 0.1% methionine, choline deficient | 60 kcal % fat | 10 kcal % fat | Standard chow |
| Composition (g) | | | | |
| Casein, 80 Mesh | 0 | 0 | 0 | — |
| L-Cystine | 4.2 | 4.2 | 4.2 | — |

TABLE 1-continued

| Diet | HFAAMCD | HFAA | LFAA | LF |
|---|---|---|---|---|
| L-Isoleucine | 7.6 | 7.6 | 7.6 | — |
| L-Leucine | 15.8 | 15.8 | 15.8 | — |
| L-Lysine | 13.2 | 13.2 | 13.2 | — |
| L-Methionine | 0.8 | 5.1 | 5.1 | — |
| L-Phenylalanine | 8.4 | 8.4 | 8.4 | — |
| L-Threonine | 7.2 | 7.2 | 7.2 | — |
| L-Tryptophan | 2.1 | 2.1 | 2.1 | — |
| L-Valine | 9.3 | 9.3 | 9.3 | — |
| L-Histidine | 4.6 | 4.6 | 4.6 | — |
| L-Alanine | 5.1 | 5.1 | 5.1 | — |
| L-Arginine | 6.0 | 6.0 | 6.0 | — |
| L-Aspartic Acid | 12.1 | 12.1 | 12.1 | — |
| L-Glutamic Acid | 38.2 | 38.2 | 38.2 | — |
| Glycine | 3.0 | 3.0 | 3.0 | — |
| L-Proline | 17.8 | 17.8 | 17.8 | — |
| L-Serine | 10.0 | 10.0 | 10.0 | — |
| L-Tyrosine | 9.2 | 9.2 | 9.2 | — |
| Corn Starch | 0 | 0 | 502 | — |
| Maltodextrin 10 | 130.1 | 125.8 | 130.1 | — |
| Sucrose | 68.8 | 68.8 | 68.8 | — |
| Cellulose, BW200 | 50 | 50 | 50 | — |
| Soybean Oil | 25 | 25 | 25 | — |
| Lard | 245 | 245 | 20 | — |
| Mineral Mix S10026 | 10 | 10 | 10 | — |
| DiCalcium Phosphate | 13 | 13 | 13 | — |
| Calcium Carbonate | 5.5 | 5.5 | 5.5 | — |
| Potassium Citrate, 1 H2O | 16.5 | 16.5 | 16.5 | — |
| Sodium BiCarbonate | 7.5 | 7.5 | 7.5 | — |
| Vitamin Mix V10001 | 10 | 10 | 10 | — |
| Choline Bitartrate | 0 | 2 | 2 | — |
| FD&C Yellow Dye #5 | 0 | 0.025 | 0.04 | — |
| FD&C Red Dye #40 | 0.025 | 0 | 0 | — |
| FD&C Blue Dye #1 | 0.025 | 0.025 | 0.01 | — |
| Total mass (g) | 756.05 | 758.05 | 1039.35 | — |
| Mass (g) | | | | |
| Protein | 174.6 | 178.9 | 178.9 | — |
| Carbohydrate | 208.9 | 204.6 | 700.9 | — |
| Fat | 270.0 | 270.0 | 45.0 | — |
| Fiber | 50.0 | 50.0 | 50.0 | — |
| Mass fraction (%) | | | | |
| Protein | 23.1 | 23.6 | 17.2 | 26.5 |
| Carbohydrate | 27.6 | 27.0 | 67.4 | 61.2 |
| Fat | 35.7 | 35.6 | 4.3 | 7.5 |
| Fiber | 6.6 | 6.6 | 4.8 | 4.7 |
| Energy (kcal) | | | | |
| Protein | 698 | 716 | 716 | — |
| Carbohydrate | 836 | 818 | 2804 | — |
| Fat | 2430 | 2430 | 405 | — |
| Total | 3964 | 3964 | 3924 | — |
| Energy fraction (kcal %) | | | | |
| Protein | 18 | 18 | 18 | 26 |
| Carbohydrate | 21 | 21 | 71 | 14 |
| Fat | 61 | 61 | 10 | 60 |
| Energy density (kcal/g) | 5.2 | 5.2 | 3.8 | 4.1 |

Figure 6:
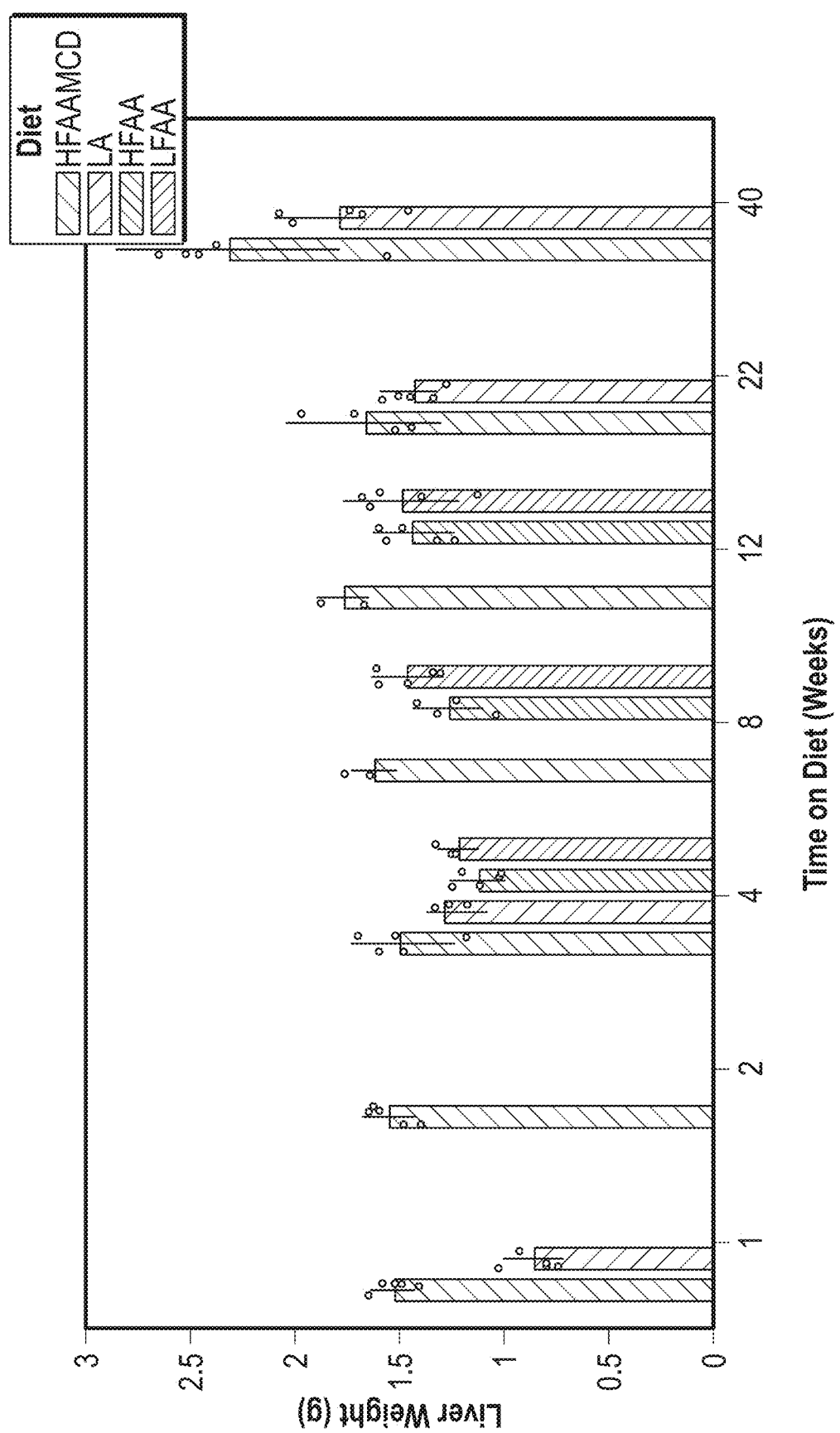
FIG. 6 illustrates liver weight as a function of time for mice fed on varying diets, according to one example.

Mice were fed on these diets for between 1 and 40 weeks in order to observe a wide range of liver steatosis and fibrosis. Mice on the HFAAMCD diet exhibited marked and progressive hepatomegaly compared to mice fed LF, LFAA, and HFAA diets (FIG. 6). FIG. 6 illustrates liver weight as a function of time on each diet. Livers were weighed during necropsy after gently blotting dry.

Figure 7A:
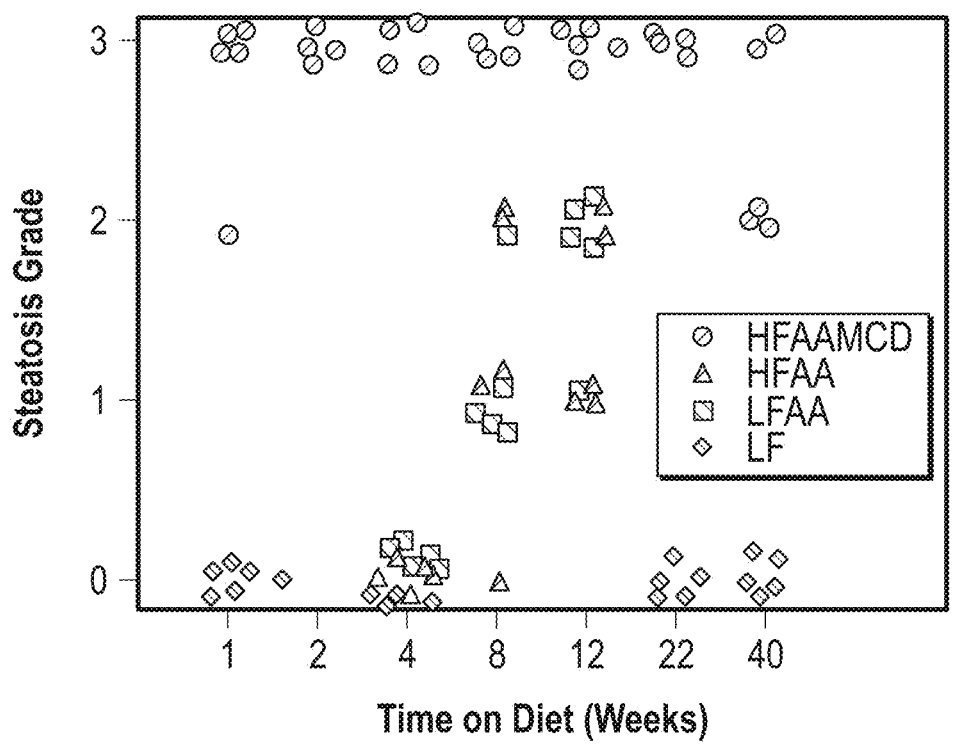
FIGS. 7A-7B show steatosis and fibrosis progression for mice fed on varying diets, according to one example.
Figure 7B:
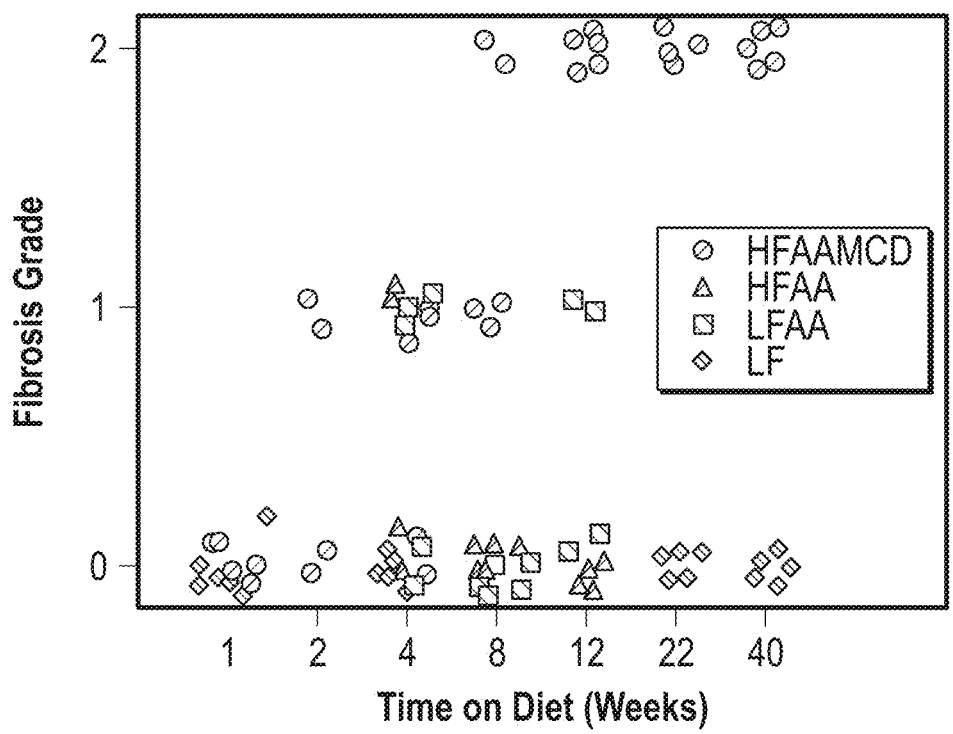

The progression of steatosis was established using T1-weighted MRI of the mouse abdomen oriented along the coronal plane before (not shown) and after 22 weeks of feeding on HFAAMCD diet. Hepatomegaly and hyperintensity of the liver indicate steatohepatitis. Hematoxylin and eosin (H&E) and Sirius Red (SR) histology slides were prepared from each liver and together graded for steatosis and fibrosis (not shown). Severe steatosis developed rapidly with fibrosis following more gradually in HFAAMCD diet mice (FIGS. 7A-7B). Mild steatosis developed consistently in HFAA and LFAA mice. No steatosis or fibrosis was observed in LF mice. Steatosis was exclusively microvesicular in cases of mild (grade 1) steatosis. Both macrovesicular and microvesicular steatosis was present in all cases of moderate (grade 2) and severe (grade 3) steatosis. Mild to moderate inflammation was present in most cases of severe steatosis, especially those with any fibrosis.

The ability of the portable MR sensor to measure liver steatosis and fibrosis was then characterized in a controlled setting without other confounding tissues (e.g. intra-abdominal fat). Freshly excised livers from mice were scanned with the portable MR sensor using a CPMG pulse sequence.

Figure 2A:
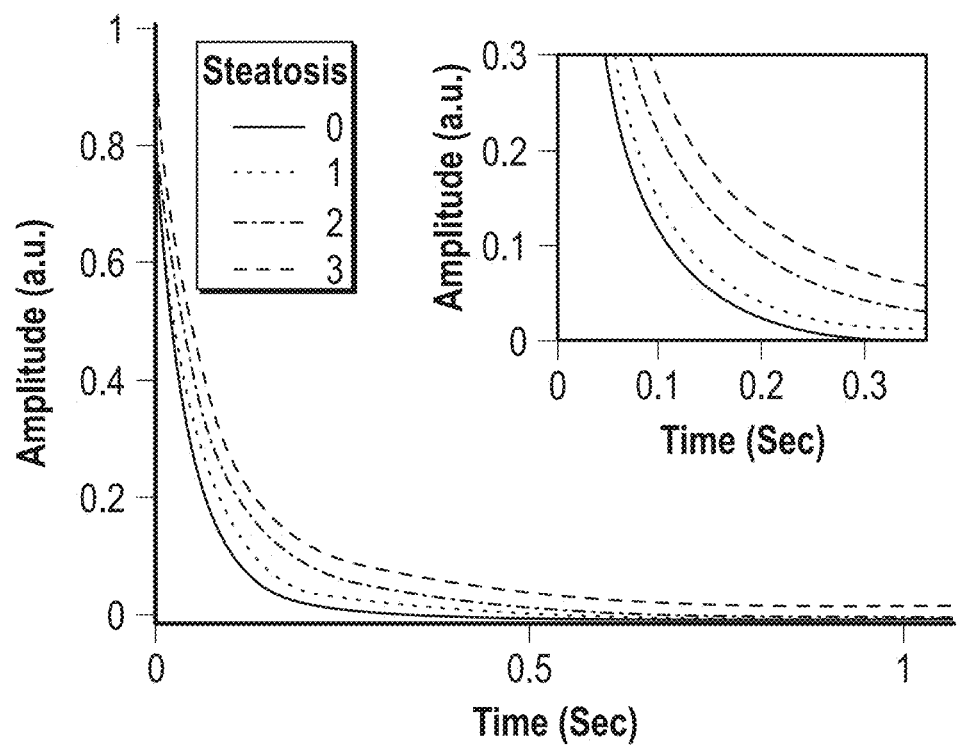
FIG. 2A shows time domain plots of T2 decay curve from liver tissue across steatosis grades, according to one example.
Figure 2B:
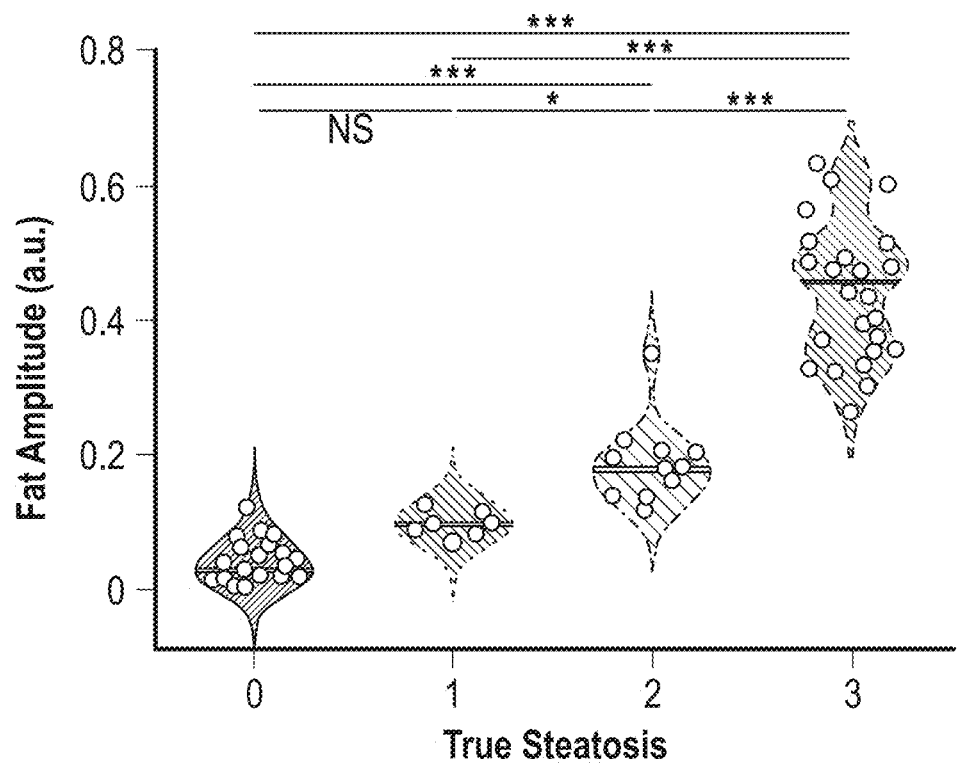
FIG. 2B estimates fat amplitude versus steatosis grade.
Figure 2C:
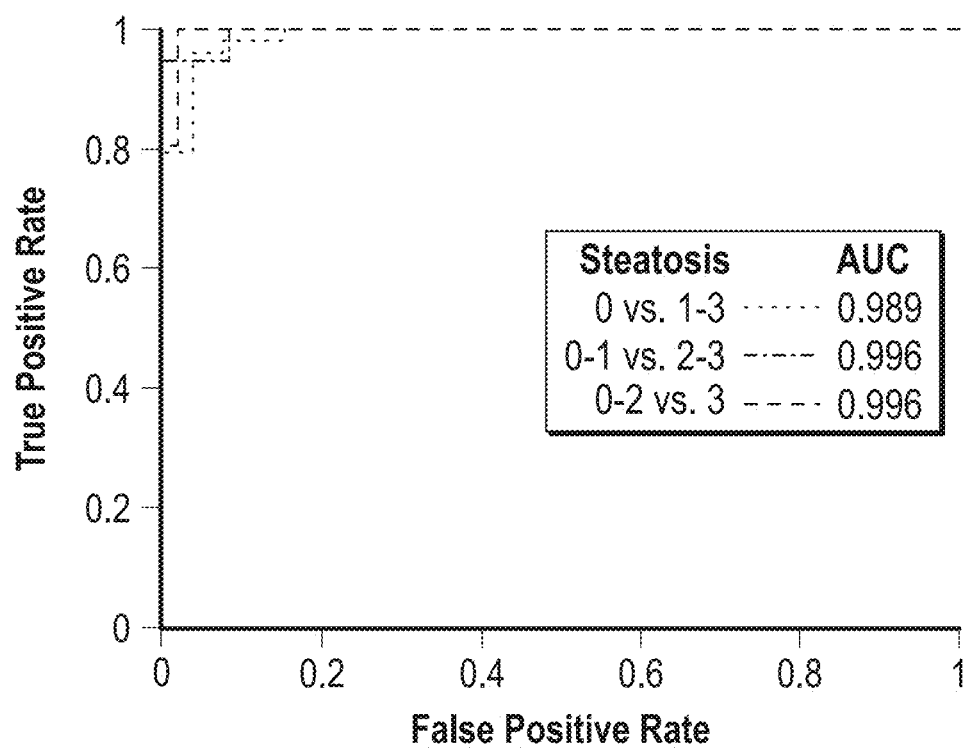
FIG. 2C shows ROC of classifiers between steatosis grades.
Figure 2D:
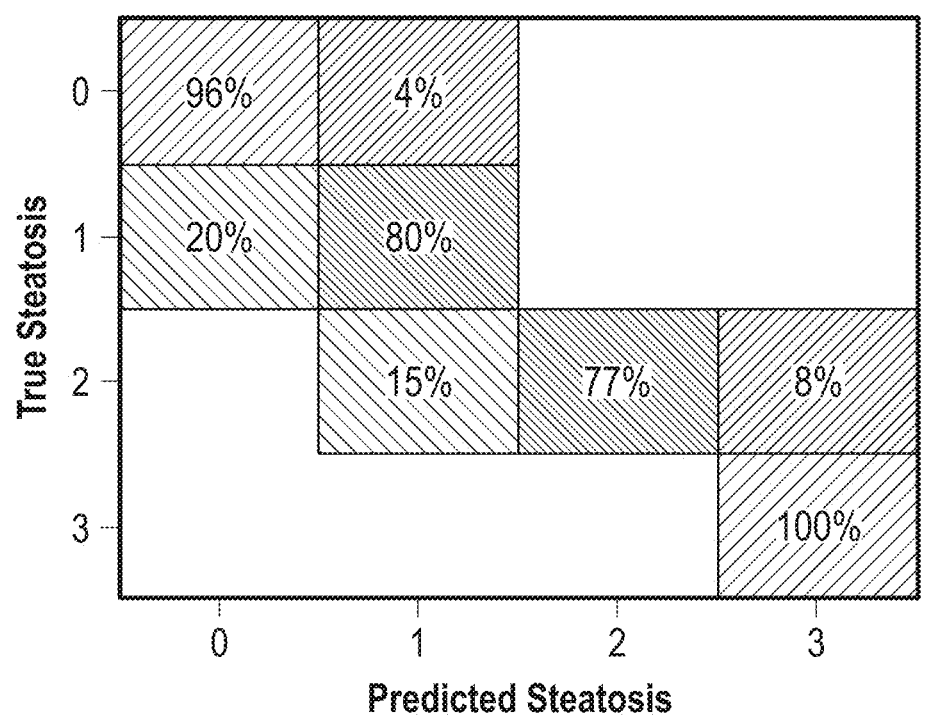
FIG. 2D is a confusion matrix of predicted versus true steatosis.

Representative time domain signals across steatosis grades show increased relaxation time with increased histological steatosis grade (FIG. 2A). The slowest relaxation component in a triexponential fit corresponds to the fat within the liver tissue, similarly to the synthetic tissue phantoms. The fat amplitude estimated by the portable MR sensor is significantly different between steatosis grades and increases with increasing steatosis grade (FIG. 2B). Specifically, FIG. 2B shows estimated fat amplitude versus steatosis grade. Median indicated via horizontal line. * $P<0.001$,  $P<0.01$; * $P<0.05$; NS, not significant; One-way analysis of variance (ANOVA) between groups ($P=1.2\times10^{-32}$; $F=174.02$; Tukey-Kramer test was used for post hoc multiple comparisons, n=26, 10, 13, 26 biologically independent mice, left to right). Receiver operator curves of classifiers between steatosis grades based on the fat amplitude show a very strong ability to discriminate between grades (FIG. 2C). Specifically, FIG. 2C shows ROCs of classifiers between steatosis grades demonstrate area under ROC (AUROC) of 0.99 (95% C.I., 0.98 to 1.00) (0 vs. 1-3), 1.00 (95% C.I., 0.99 to 1.00) (0-1 vs. 2-3), and 1.00 (95% C.I., 0.98 to 1.00) (0-2 vs. 3). A confusion matrix showing the relationship between predicted and true steatosis grade shows high accuracy performance across all steatosis grades (FIG. 2D), demonstrating an overall accuracy of 92% and Cohen's kappa of 0.89 (95% C.I., 0.80 to 0.97).

Figure 8A:
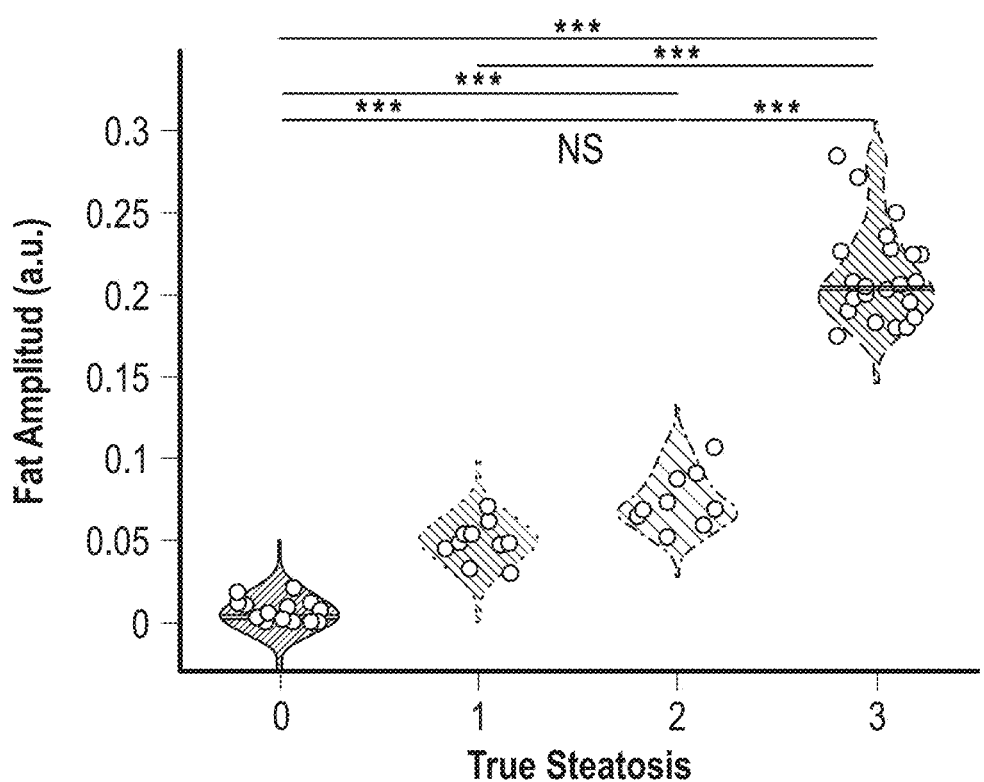
FIGS. 8A-8C depict measurement of ex vivo livers in a benchtop NMR spectrometer, according to one example.
Figure 8B:
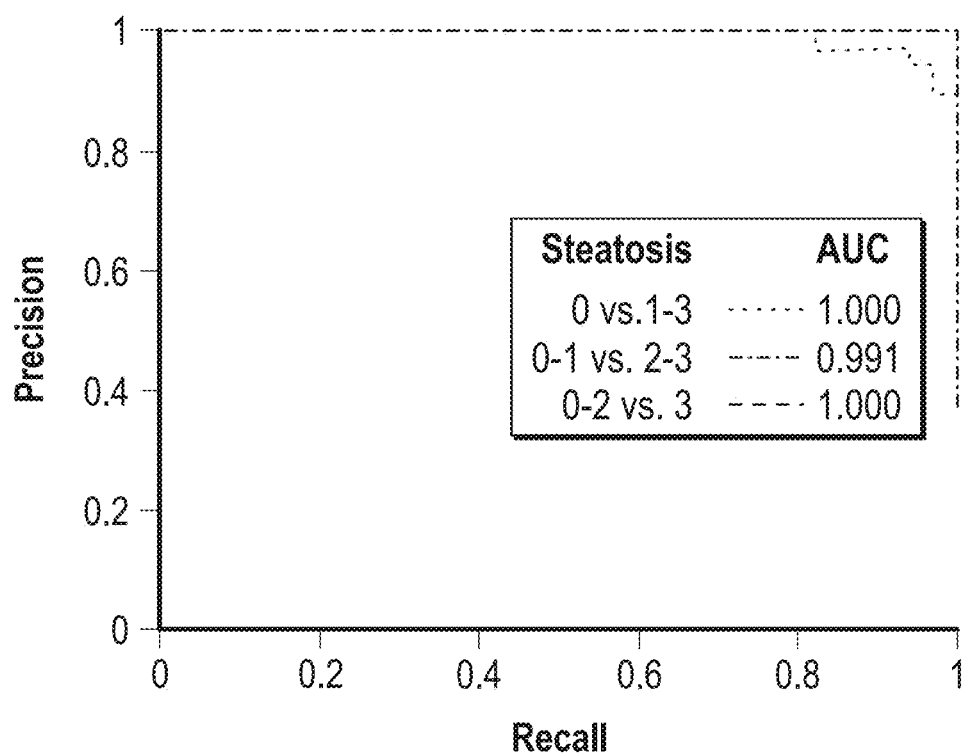
Figure 8C:
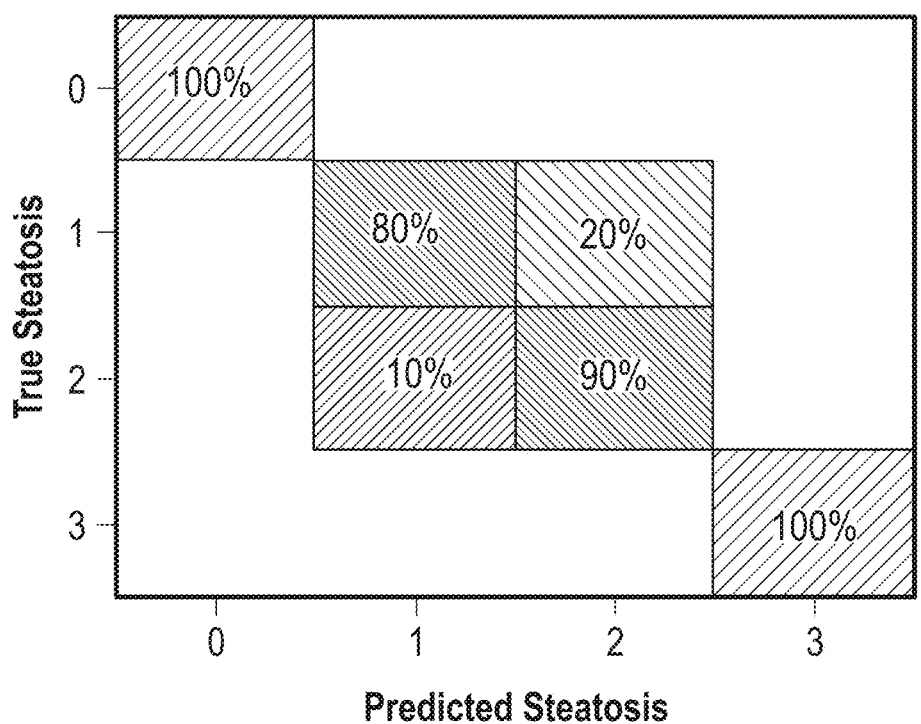

The ability of multicomponent T2 relaxometry to accurately and reproducibly predict steatosis grade independently from the portable MR sensor was validated using a benchtop NMR spectrometer (FIGS. 8A-8C). FIG. 8A shows estimated fat amplitude versus steatosis grade. Median indicated via horizontal line. * $P<0.001$,  $P<0.01$; * $P<0.05$; NS, not significant; One-way ANOVA between groups ($P=6.1\times10$-42; $F=464.346$; Tukey-Kramer test was used for post hoc multiple comparisons, n=21, 10, 10, 24 independent samples, left to right). FIG. 8B depicts ROC of classifiers between steatosis grades demonstrate AUROC of 1.00 (95% C.I., 1.00 to 1.00) (0 vs. 1-3), 0.99 (95% C.I., 0.98 to 1.00) (0-1 vs. 2-3), and 1.00 (95% C.I., 1.00 to 1.00) (0-2 vs. 3). FIG. 8C illustrates a confusion matrix of predicted versus true steatosis demonstrates an overall accuracy of 95% and Cohen's kappa of 0.94 (95% C.I., 0.86 to 1.00).

The fibrosis was measured within livers using a diffusion-weighted measurement of fluid within the tissue. Fibrosis is known to be negatively associated with the diffusivity of water within livers. Single-sided MR systems have previously demonstrated sensitivity towards changes in sample diffusion. Here the inherent field inhomogeneity of the static magnetic field was leveraged to encode diffusivity by varying the echo time of the CPMG measurement. An increased echo time causes the signal to attenuate more rapidly in highly diffusive samples. The portable MR sensor is capable of estimating relative differences in sample diffusivity via diffusion-weighted multicomponent T2 relaxometry in agreement with gold standard estimates from a benchtop NMR spectrometer via pulse gradient spin echo measurements. Healthy liver exhibits high self-diffusion coefficient of extracellular water compared to fibrotic livers. Multicomponent T2 relaxometry allows identification of the signal attributed to each of the fluid compartments within the liver: intracellular water, extracellular water, and fat. A diffusion weighted (DW) liver signal is defined as the difference in the amplitude of the extracellular fluid component at a short (65 us) and long (520 us) echo time.

Figure 2E:
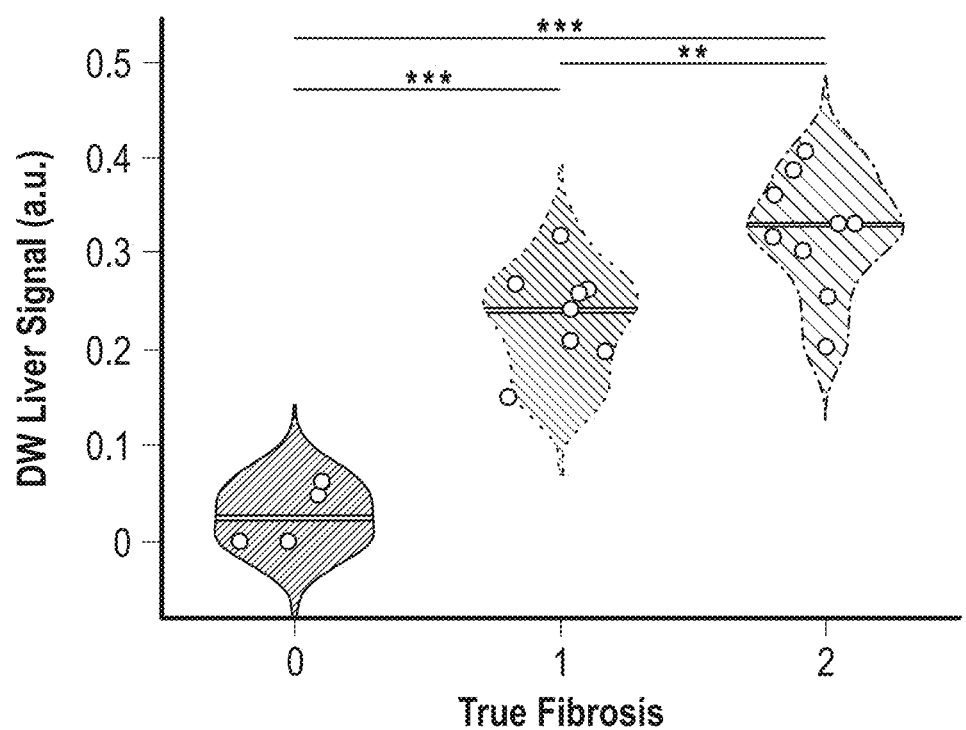
FIG. 2E shows estimated diffusion-weighted liver signal (fibrosis) versus fibrosis grade.
Figure 2F:
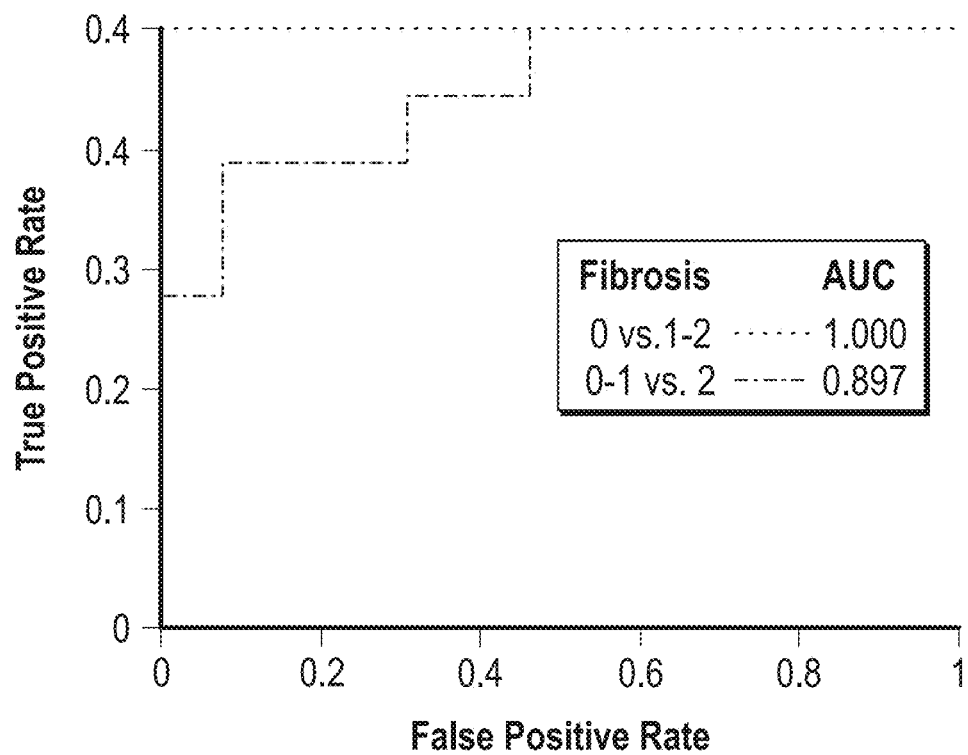
FIG. 2F shows ROC of classifiers between steatosis grades.
Figure 2G:
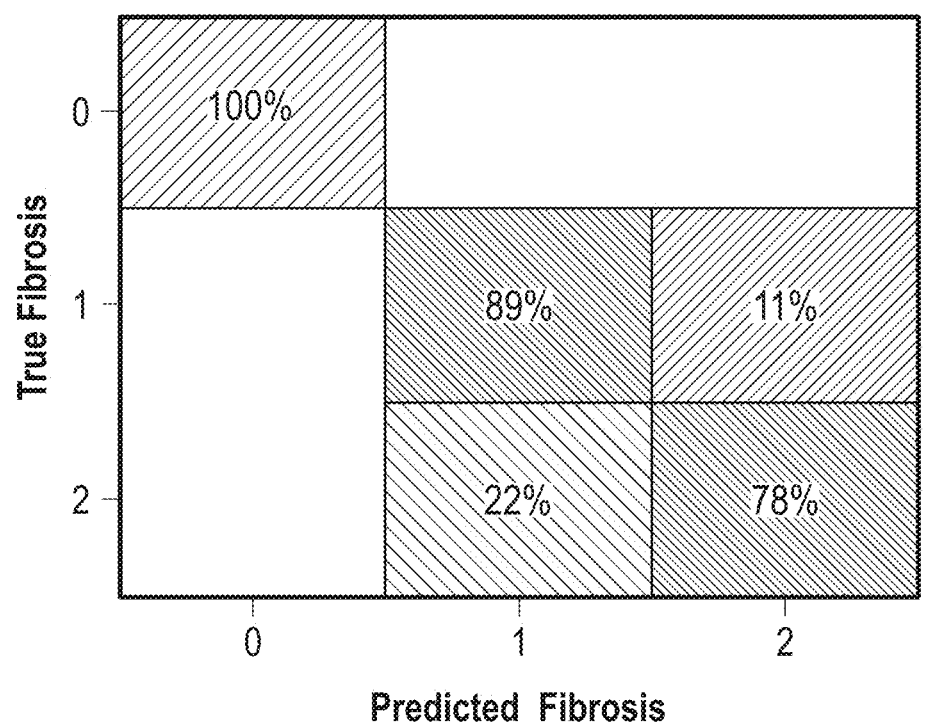
FIG. 2G is a confusion matrix of predicted versus true steatosis.

This DW liver signal correlates with fibrosis and is significantly different between fibrosis grades (FIG. 2E). Specifically, FIG. 2E shows estimated diffusion-weighted liver signal (fibrosis) versus fibrosis grade. Median indicated via horizontal line. * $P<0.001$,  $P<0.01$; * $P<0.05$; NS, not significant; One-way ANOVA between groups ($P=2.6\times10^{-7}$; $F=37.41$; Tukey-Kramer test was used for post hoc multiple comparisons, n=4, 9, 9 biologically independent mice, left to right). ROC curves of classifiers between fibrosis grades based on the DW liver signal show a strong ability to discriminate between grades (FIG. 2F). In FIG. 2F, ROC of classifiers between fibrosis grades demonstrate AUROC of 1.00 (95% C.I., 1.00 to 1.00) (0 vs. 1-2), and 0.90 (95% C.I., 0.79 to 0.96) (0-1 vs. 2). A confusion matrix showing the relationship between predicted and true fibrosis grade shows high accuracy performance across all fibrosis grades (FIG. 2G), with an overall accuracy of 86% and Cohen's kappa of 0.78 (95% C.I., 0.56 to 1.00). These data highlight the capability of the MR sensor described herein to identify steatosis and fibrosis in mouse liver tissue and staging and tracking progression of NAFLD and NASH.

Example 3: Ex Vivo Human Liver Tissue

This approach generalizes to human liver tissue obtained from whole ex vivo livers. Portable MR measurements were performed on a piece of liver tissue and then H&E histology was performed on the same sample to grade steatosis. Fibrosis was not assessed as an insufficient number of fibrotic livers were encountered during the study period. Steatosis was almost exclusively microvesicular in cases of mild (grade 1) steatosis. Both macrovesicular and microvesicular steatosis was present in all cases of moderate (grade 2) steatosis. Mild to moderate inflammation was present in some cases of mild and all cases of moderate steatosis. Human liver tissue was placed on top of the sensor and measurements performed to identify liver steatosis. Time domain signals across steatosis grades showed increased relaxation time in livers from patients with increased steatosis grade.

Figure 3A:
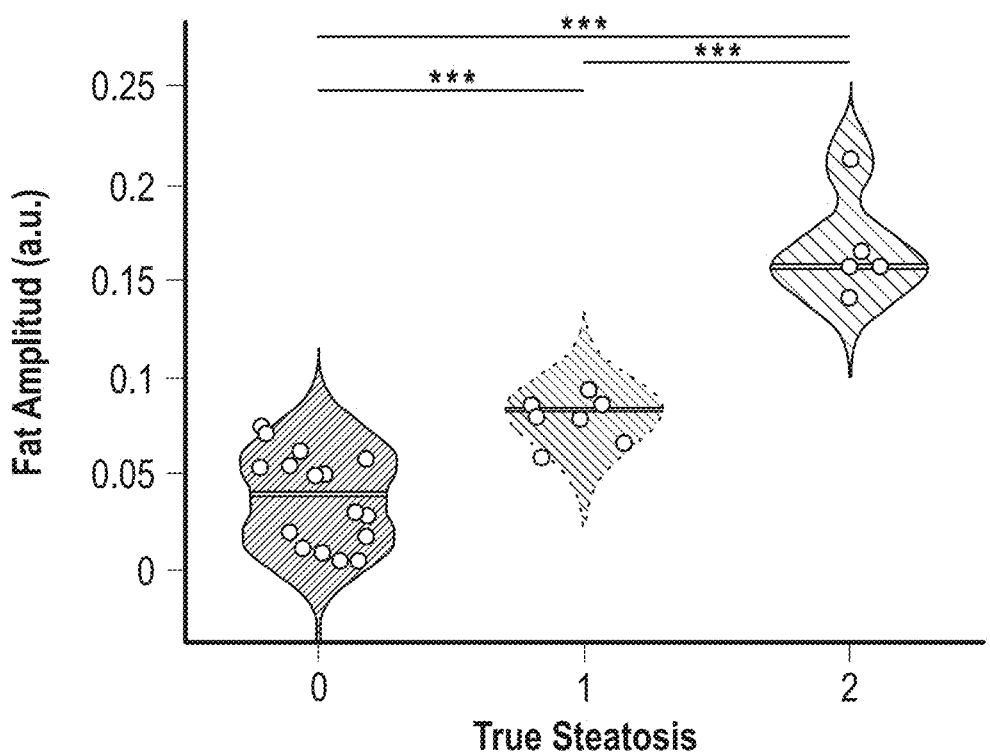
FIGS. 3A-3C show that the portable MR sensor accurately stages steatosis from excised human livers, according to one example.
Figure 3B:
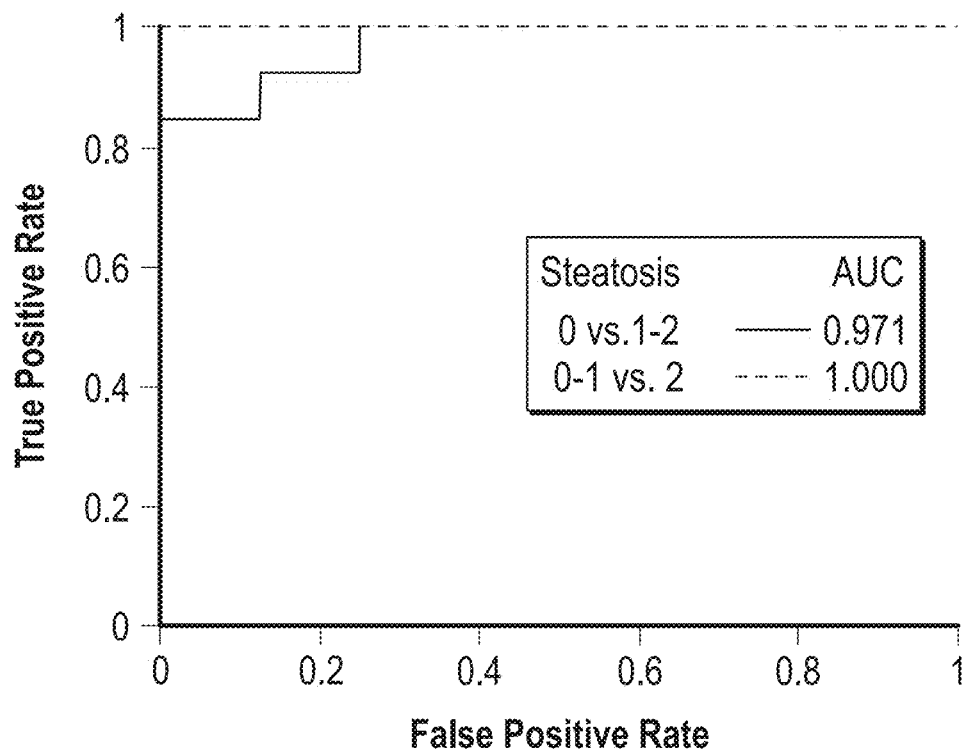
Figure 3C:
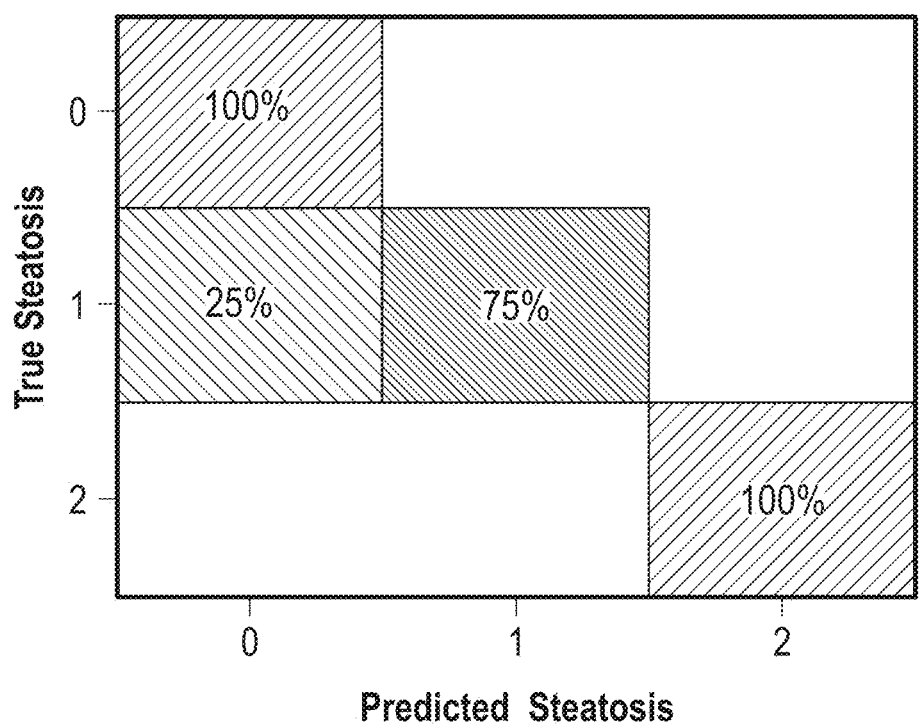

The fat amplitude estimated by the portable MR sensor is significantly different between steatosis grades (FIG. 3A). Specifically, FIG. 3A shows estimated fat amplitude versus steatosis grade. Median indicated via horizontal line. * $P<0.001$,  $P<0.01$; * $P<0.05$; NS, not significant; One-way ANOVA between groups ($P=7.3\times10^{-11}$; $F=65.29$; Tukey-Kramer test was used for post hoc multiple comparisons, n=16, 8, 5 independent samples, left to right). ROC curves of classifiers between steatosis grades based on the fat amplitude show a very strong ability to discriminate between grades (FIG. 3B). Specifically, as shown in FIG. 3B, ROC of classifiers between steatosis grades demonstrate AUROC of 0.97 (95% C.I., 0.90 to 0.99) (0 vs. 1-2) and 1.00 (95% C.I., 1.00 to 1.00) (0-1 vs. 2). A confusion matrix showing the relationship between predicted and true steatosis grade shows high accuracy performance across all steatosis grades (FIG. 3C), with an overall accuracy of 93% and Cohen's kappa of 0.88 (95% C.I., 0.72 to 1.00). These findings show that the portable MR sensor can accurately identify liver steatosis grade in human liver tissue samples using the same methods developed for liver steatosis in mice. Straightforward extensions of this approach could enable measurements of larger liver tissue samples for both ex vivo and in vivo use.

Example 4: Measurement Localization

Figure 4A:
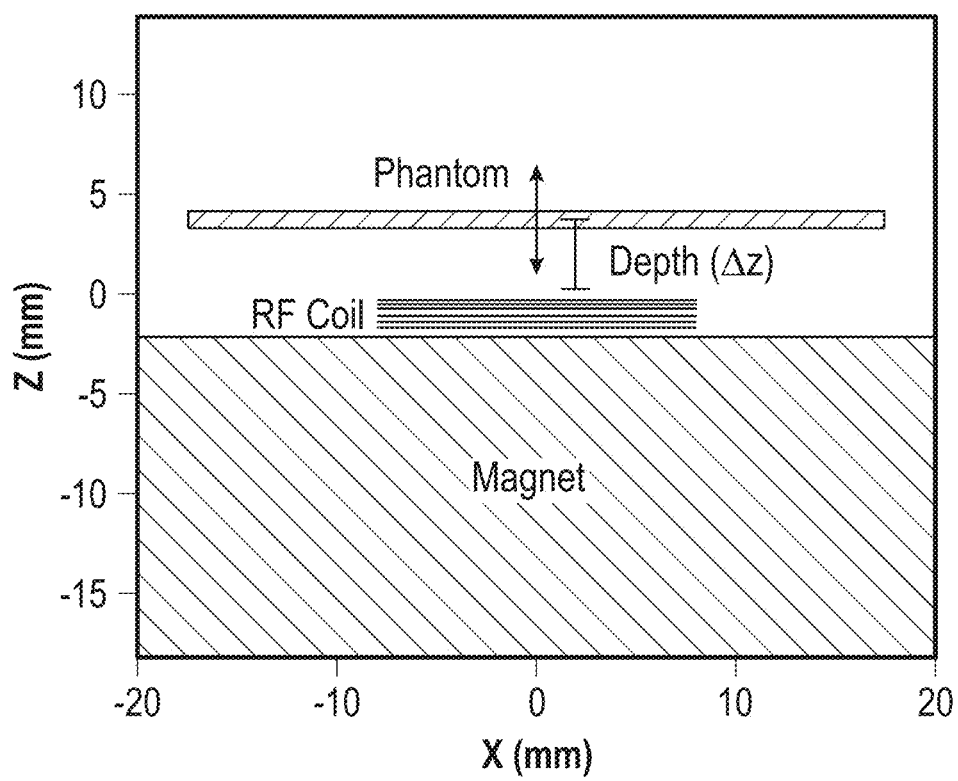
FIGS. 4A-4G show that the portable MR sensor accurately stages steatosis in vivo via multicomponent T2 relaxometry, according to one example.
Figure 9A:
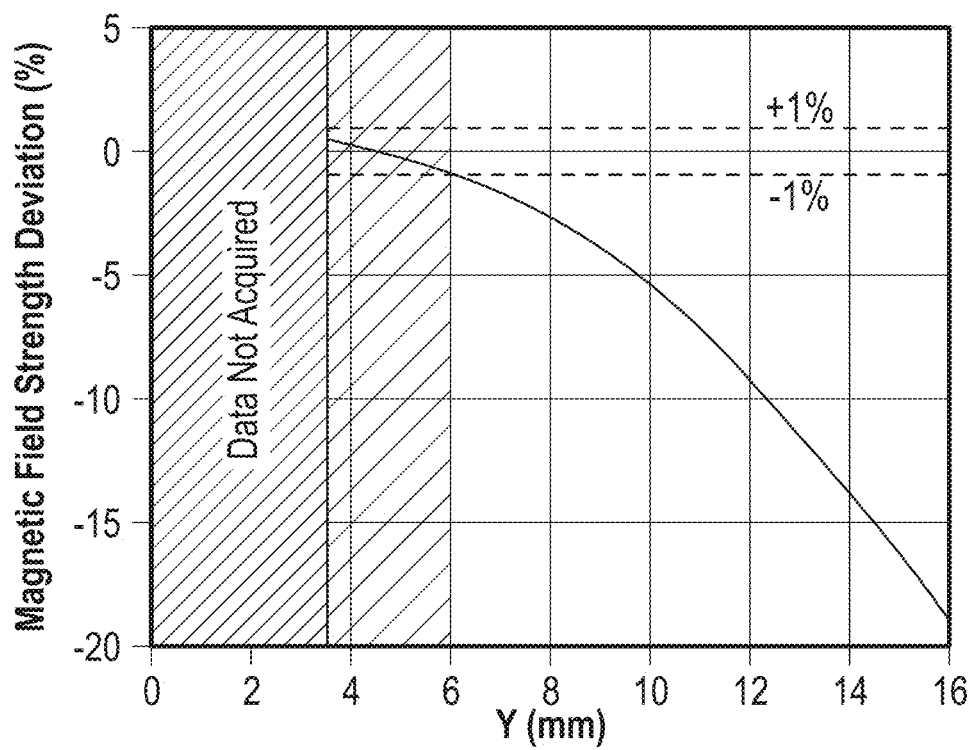
FIGS. 9A-9B depict that static magnetic field profile characterization of the portable MR sensor demonstrates linear field variation, according to one example. Magnetic field strength deviation was measured perpendicular to the surface of the sensor (FIG. 9A) and parallel to the magnetic field within the uniform region (FIG. 9B).
Figure 9B:
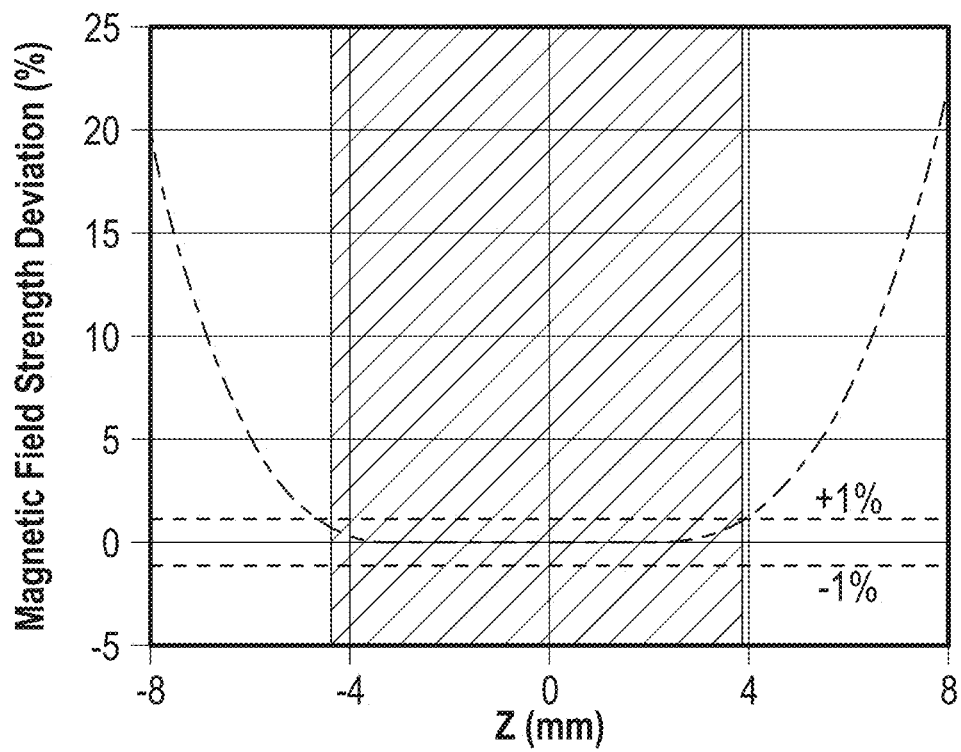
Figure 10A:
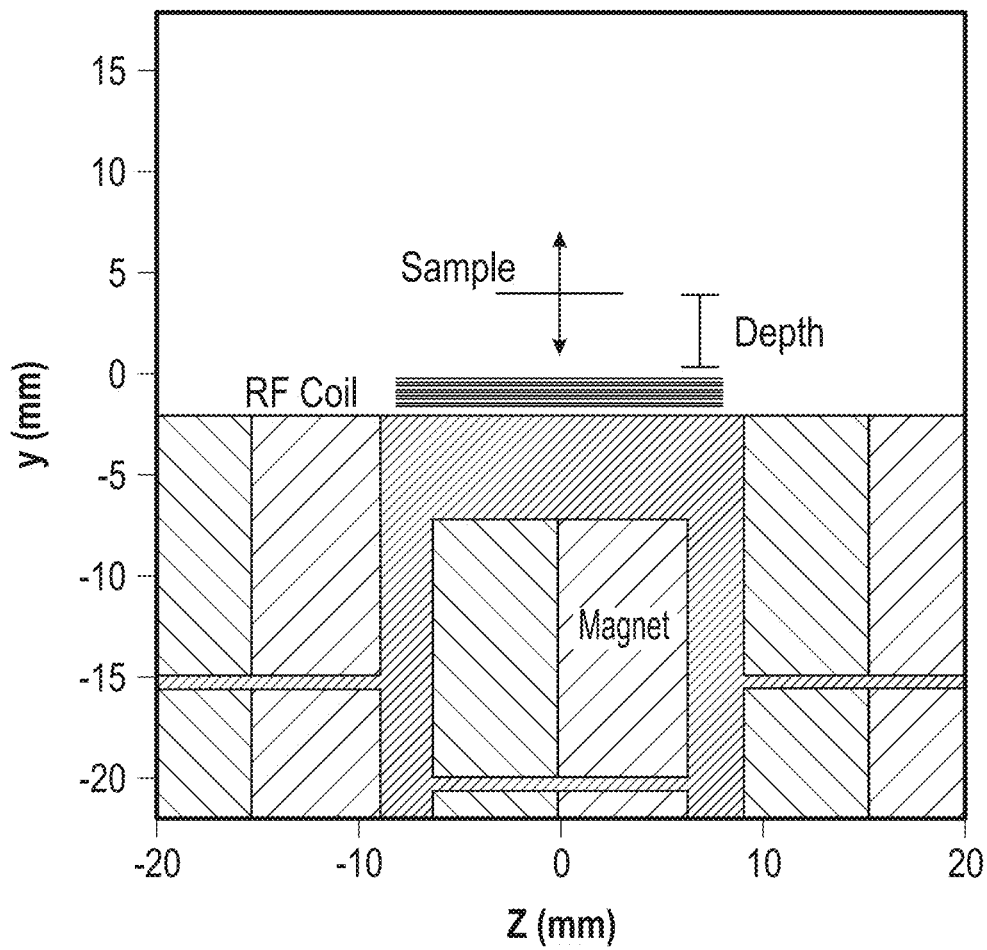
FIGS. 10A-10C illustrate the sensitivity profile of a portable MR sensor versus depth at various RF excitation frequencies, according to one example.
Figure 10B:
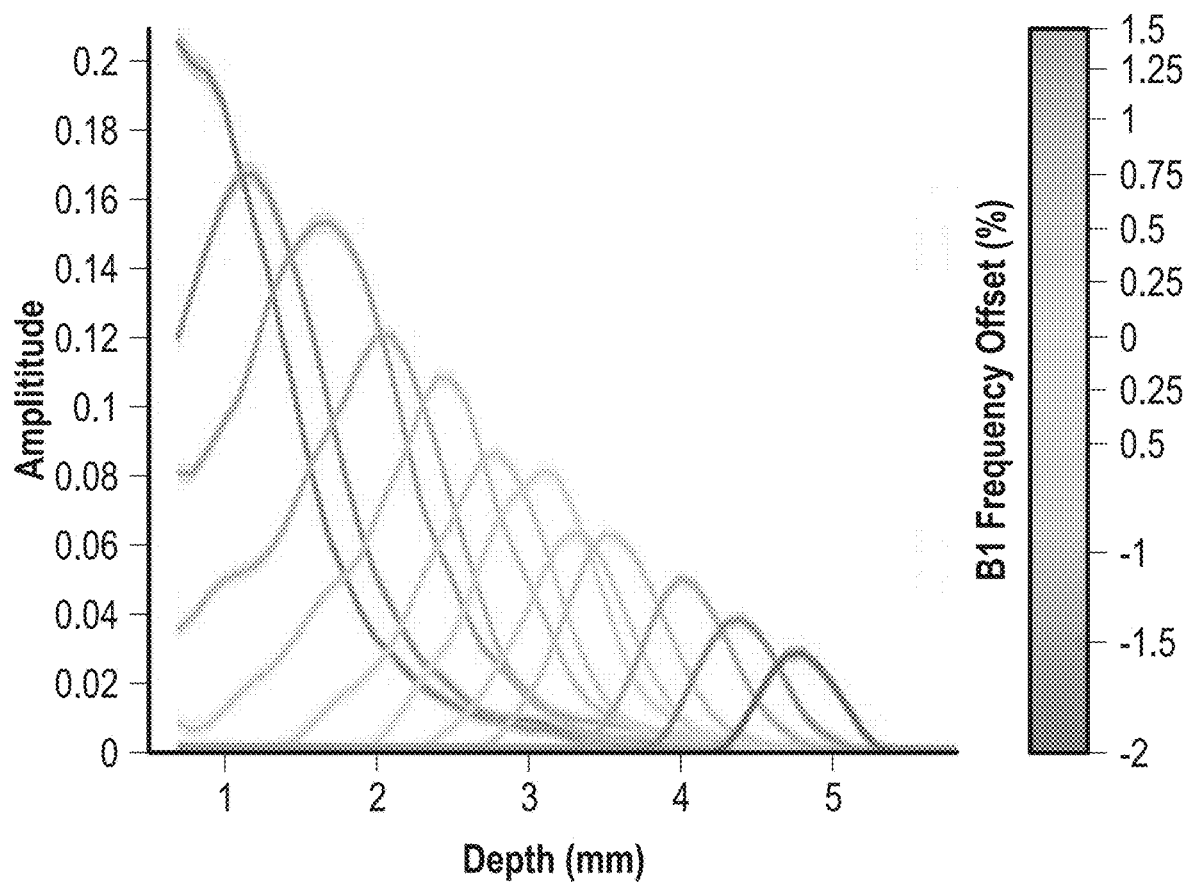
Figure 10C:
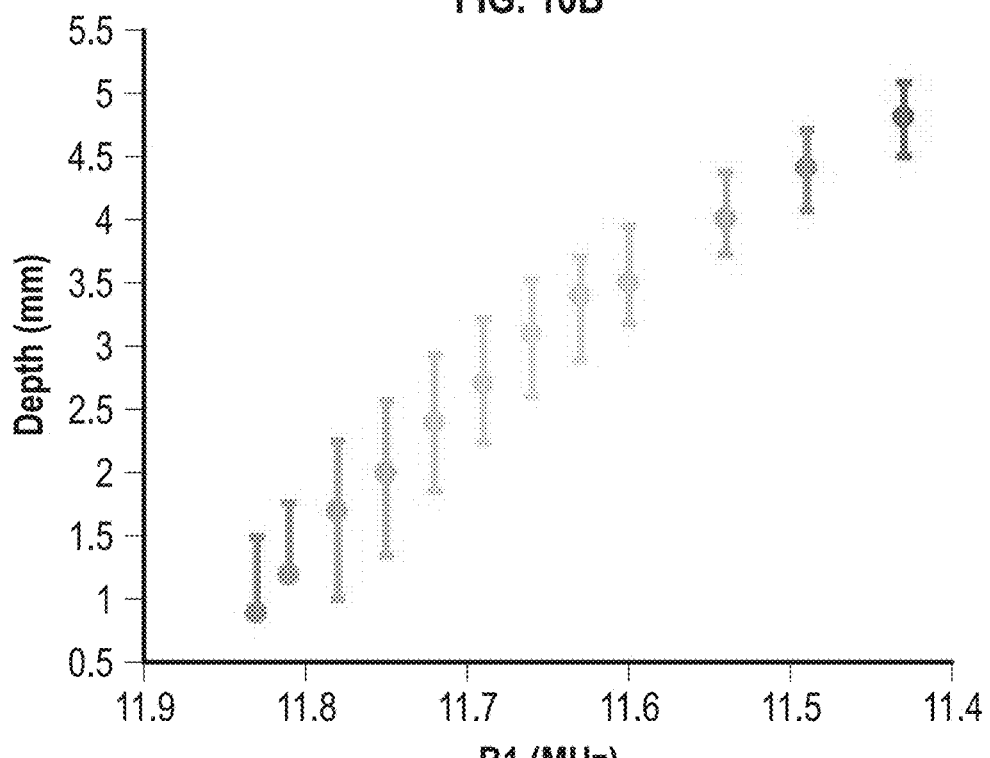

A non-invasive measurement of the liver in vivo requires that the sensor be capable of measuring tissue located within the mouse abdomen. The ideal system would avoid more proximal tissues that may confound the measurement, such as skin and subcutaneous tissue. The static magnetic field strength is highly uniform in the direction parallel to the surface of the sensor while decreasing gradually when moving away from its surface (FIGS. 9A-9B). FIGS. 9A-9B show that static magnetic field profile characterization of portable MR sensor demonstrates linear field variation across sensitive region. Measured magnetic field strength deviation from B0 along y-axis (perpendicular to the surface of the sensor, y=0 refers to the surface of the RF coil) (FIG. 9A) and z-axis (parallel to the magnetic field within the uniform region) (FIG. 9B) through the center of the uniform region. The average gradient along the y-axis within the sensitive region is 1.7 Tesla/m. Shaded regions correspond to ±1% deviation from B0 (0.28 Tesla). Field characterization was performed with a Hall probe (HMMT-6J04-VR, Lake Shore Cryotronics) connected to a gaussmeter (Model 475 DSP Gaussmeter). The magnetic field very close to the surface of the magnet was not acquired due to geometrical constraints with the specific Hall probe used. The sensitivity of the system was characterized as a function of depth at two excitation frequencies, which are used to encode spatial information. A thin planar phantom was scanned along a line perpendicular to the surface of the sensor and repeatedly measured at each excitation frequency (FIG. 4A). These results were validated by an independent characterization of sensitivity as a function of depth at twelve unique RF excitation frequencies demonstrating depth selectivity and a tradeoff between depth and signal strength (FIGS. 10A-10C).

Figure 4B:
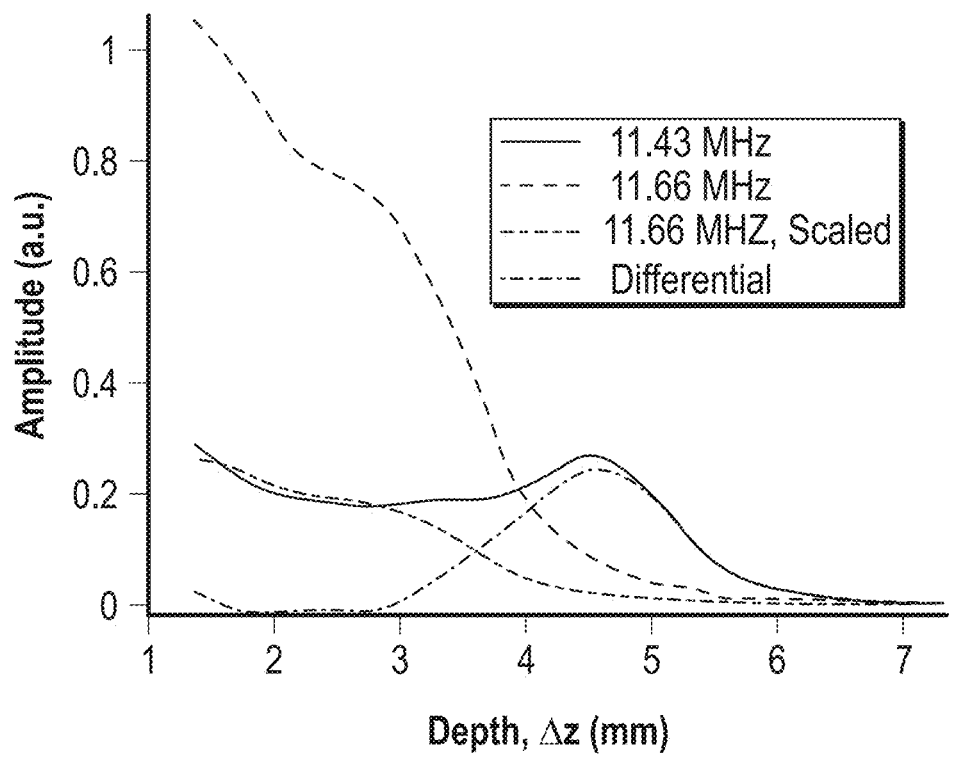

An acquisition strategy was designed to localize our measurement to a mouse liver in vivo. The sensor is more sensitive to samples located at a distance of 1 to 4 mm when operated at 11.66 MHz and 1 to 6 mm at 11.43 MHz (FIG. 4B). A measurement at 11.43 MHz would provide some sensitivity to a mouse liver, but the measurement would be confounded by more proximal tissues due to the nonzero magnitude of the 11.43 MHz signal in a region 1 to 3 mm from the sensor surface. Therefore, an acquisition strategy was designed to localize the measurement solely to a region distal (approximately 3 to 6 mm) from the surface of the sensor. The optimal scaling factor was computed that, when applied to the 11.66 MHz sensitivity profile, best aligned its most proximal region (0 to 3 mm) to that of the 11.43 MHz signal (FIG. 4B). The time-domain signal generated from an 11.66 MHz signal was then uniformly scaled with this scaling factor. The system was designed to compute the difference between this scaled time-domain signal and the signal acquired at 11.43 MHz to generate a differential signal, which provides highly localized sensitivity to a region solely distal from the surface of the sensor (FIG. 4B).

Figure 4C:
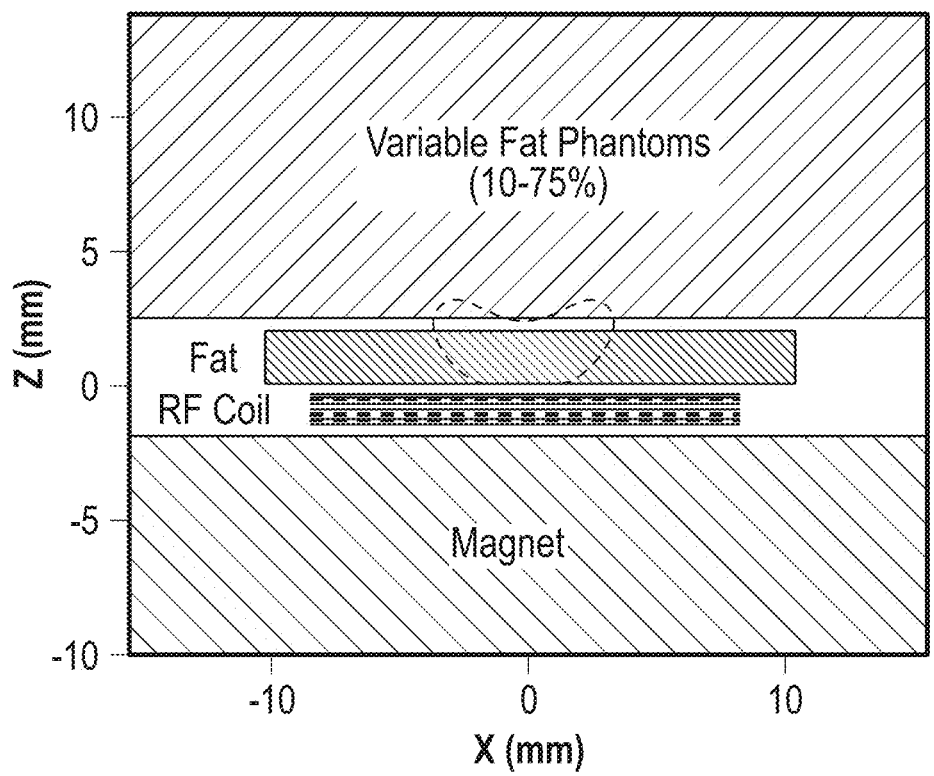
Figure 4D:
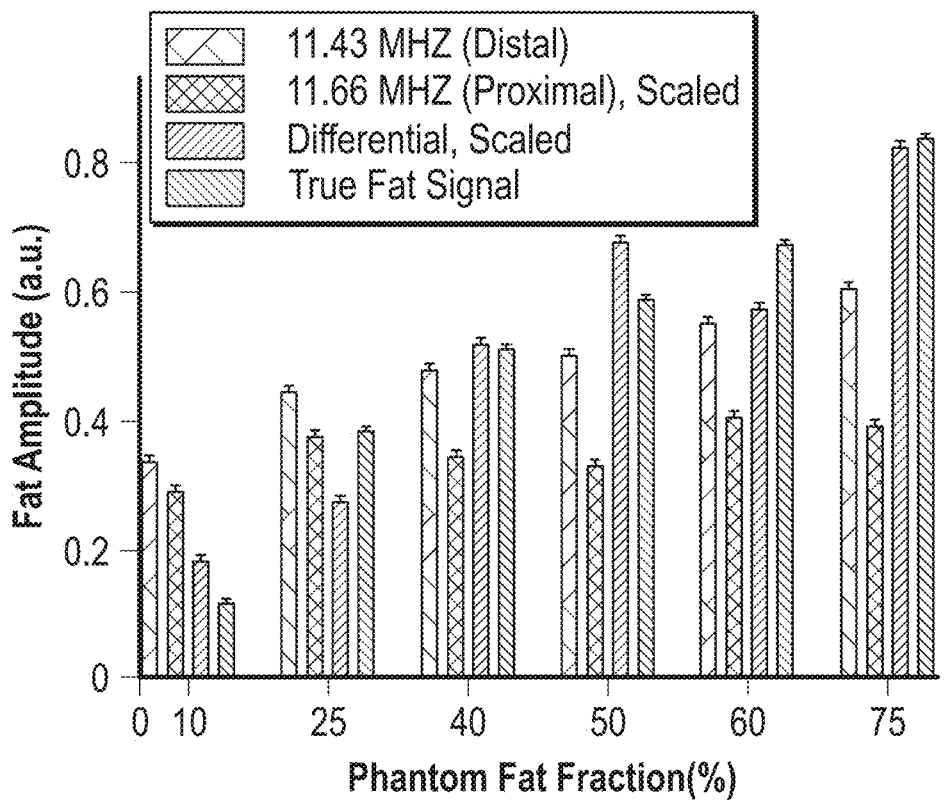

A proximal synthetic tissue phantom was constructed with a constant fat fraction (50%) and a distal phantom with variable fat fractions (10 to 75% fat) (FIG. 4C) in order to demonstrate the utility of this approach. Measurements performed at 11.66 MHz, with a mean penetration depth of 3 mm were unable to identify changes in the fat fraction of the more distal phantom (FIG. 4D). Measurements performed at 11.43 MHz, with a mean penetration depth of 5 mm, identified these changes, but failed to accurately represent the wide range of fat fractions as is evident by the small range of measured fat amplitudes (FIG. 4D). The differential measurement, in contrast, was able to both identify changes in fat fraction and more faithfully capture the wide range of fat fractions seen in the distal phantom (FIG. 4D). Moreover, the differential measurement most closely matches estimates of fat amplitude with the same portable MR sensor with no proximal fat spacer present (FIG. 4D). This shows that the system can perform highly localized measurements of tissue remote from the surface of the sensor while minimizing confounding signal from more proximal tissue. This approach avoids the use of more traditional, complex gradient coils for spatial encoding which allows the sensor to remain simple and low-cost.

Figure 4E:
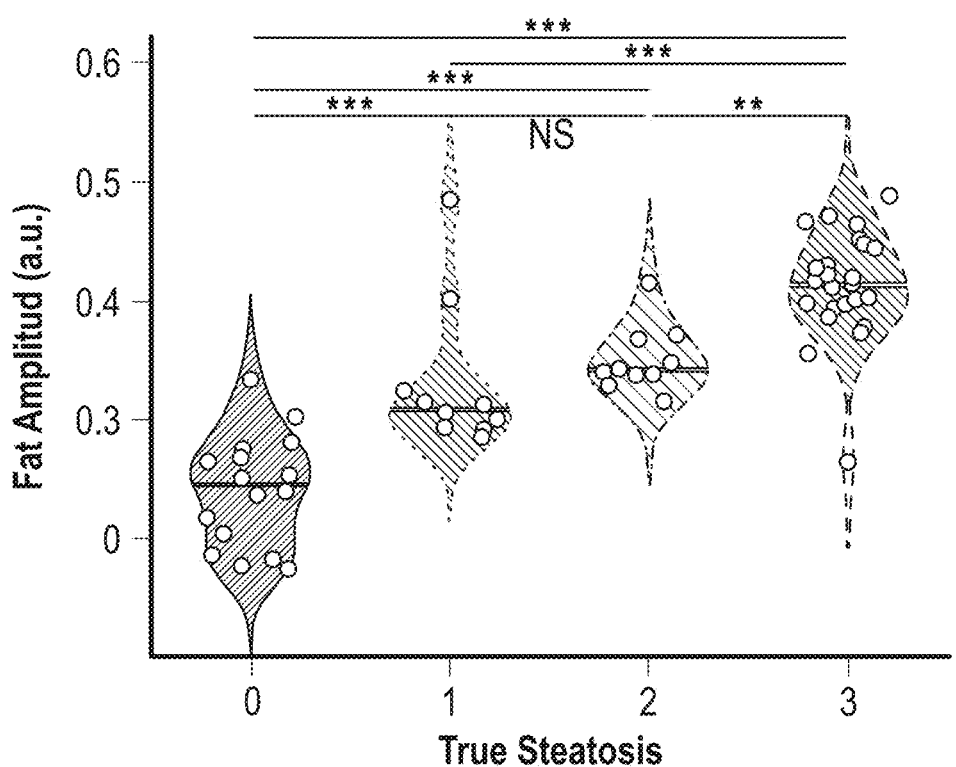
Figure 4F:
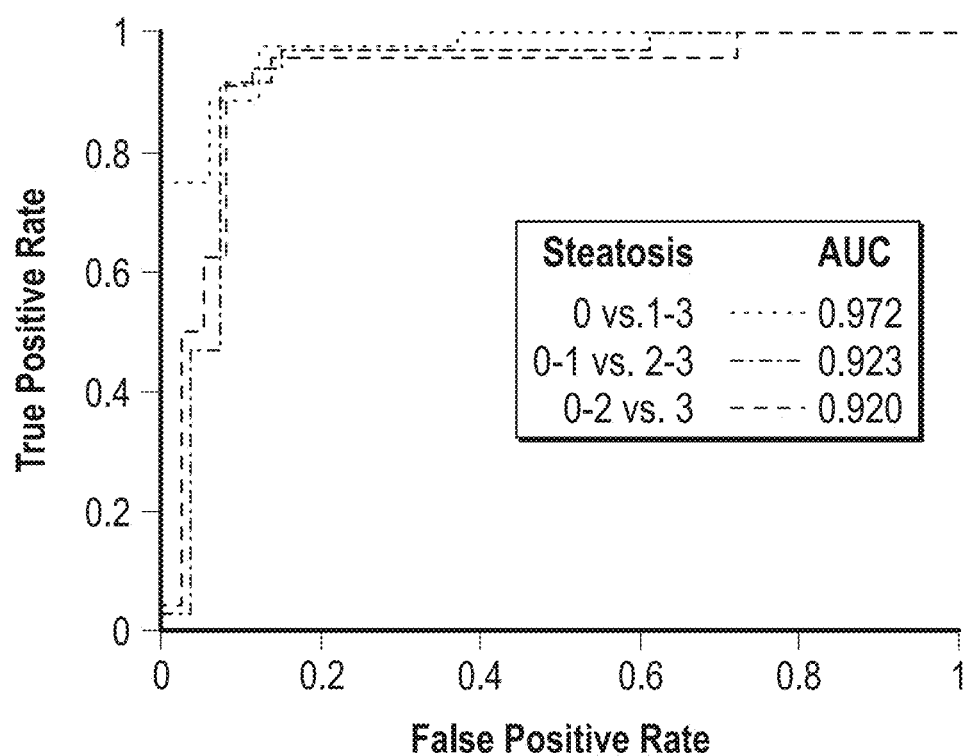
Figure 4G:
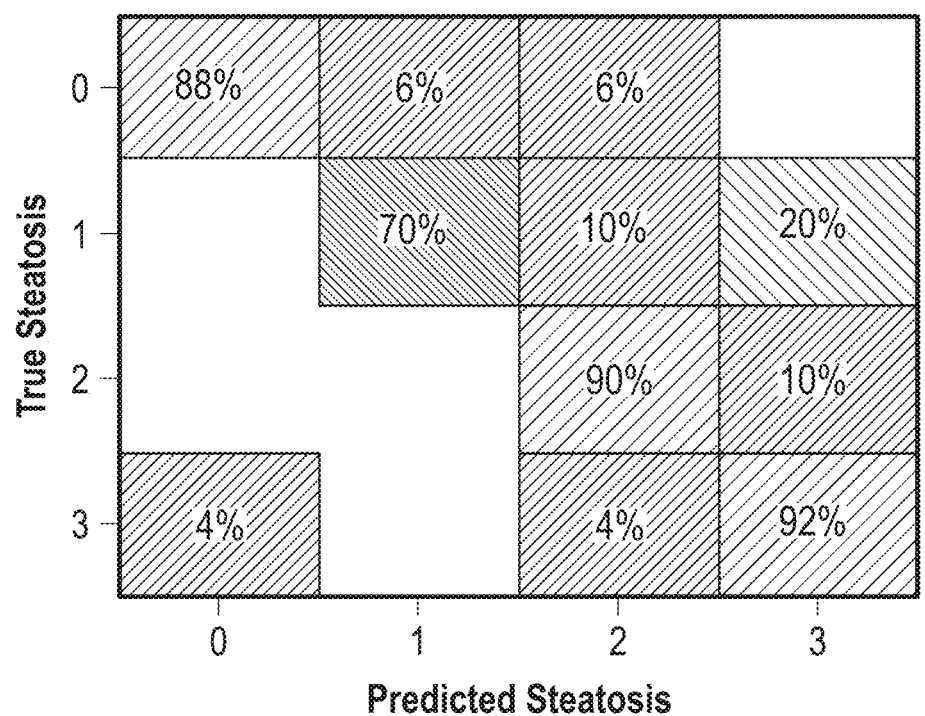

This new measurement strategy was then applied to identify liver steatosis within anesthetized mice placed on top of our sensor. Scans were performed over a ten-minute period in free breathing animals. Time domain signals across steatosis grades showed increased relaxation time with increased steatosis grade (not shown). The fat amplitude estimated by the portable MR sensor is significantly different between steatosis grades (FIG. 4E). Specifically, FIG. 4E shows estimated fat amplitude versus steatosis grade. Median indicated via horizontal line. * $P<0.001$,  $P<0.01$; * $P<0.05$; NS, not significant; One-way ANOVA between groups ($P=2.5\times10^{-14}$; $F=41.91$; Tukey-Kramer test was used for post hoc multiple comparisons, n=16, 10, 10, 24 biologically independent mice, left to right). ROC curves of classifiers between steatosis grades based on the fat amplitude show a very strong ability to discriminate between grades (FIG. 4F). FIG. 4F shows ROCs of classifiers between steatosis grades demonstrate area under ROC (AUROC) of 0.97 (95% C.I., 1.00 to 0.92) (0 vs. 1-3), 0.92 (95% C.I., 0.81 to 0.98) (0-1 vs. 2-3), and 0.92 (95% C.I., 0.82 to 0.97) (0-2 vs. 3). A confusion matrix showing the relationship between predicted and true steatosis grade shows high accuracy performance across all steatosis grades (FIG. 4G), an overall accuracy of 87% and Cohen's kappa of 0.81 (95% C.I., 0.69 to 0.93). The ability of the sensor to identify fibrosis grade in vivo was not assessed due to animal welfare restrictions on total anesthesia time. These findings show that the portable MR sensor can identify liver steatosis grade in vivo.

Figure 11:
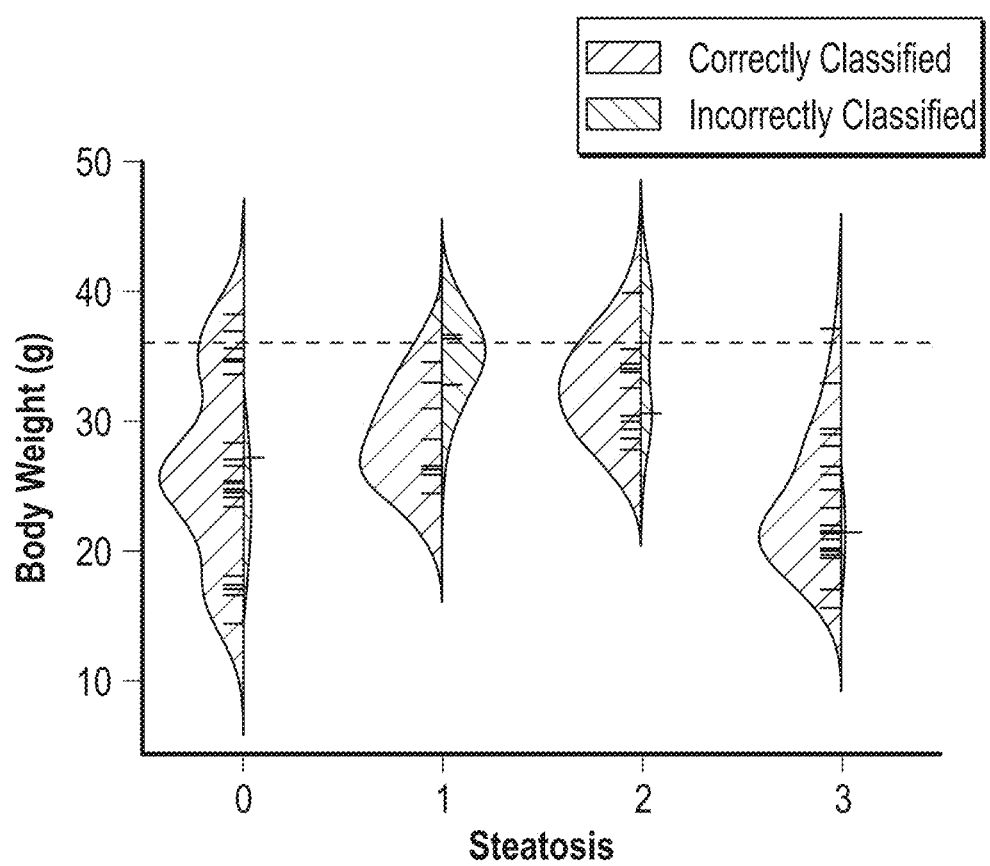
FIG. 11 depicts body weight versus steatosis grade for correctly and incorrectly classified mice based on in vivo portable MR measurements, according to one example.

The portable MR sensor accurately quantifies steatosis in vivo. It was hypothesized that when the system overestimated steatosis grade, the signal may have been confounded by subcutaneous and/or intra-abdominal fat. Of the six mice whose steatosis grade was overestimated, 50% had a body weight in the top 10th percentile (FIG. 11). Specifically, FIG. 11 shows body weight versus steatosis grade for correctly and incorrectly classified mice based on in vivo portable MR measurements. Dashes indicate body weight of individual mice (biologically independent replicates). The dashed horizontal line indicates top 10th percentile for body weight across all mice. In addition, the predicted fat amplitude strongly correlated between ex vivo and in vivo measurements with the portable MR sensor with the exception of mice with the highest body weight and, therefore, the greatest amount of visceral fat. This suggests that the measurement inadvertently attributed excess subcutaneous and/or intra-abdominal fat to more severe liver steatosis. A technique was developed that would allow first estimating proximal tissue (e.g. subcutaneous and/or intra-abdominal fat) thickness, and then performing a scan at a sufficient depth such that the majority of the signal is originating from the more distal tissue (e.g., liver) to overcome variations in proximal confounding tissue (FIGS. 12A-12D). The presence of proximal confounding tissue demonstrates the value of an improved sensor for use in humans. Acquisition in free-breathing animals may have introduced intra-animal variability or reduced SNR due to the respiratory cycle and thoracic movement. Numerical simulations were performed of additional magnet arrays for single-sided MR sensors which indicate that straightforward modifications to the sensor design described here can extend the penetration depth (FIGS. 13A-13C). Further improvements to signal localization and acquisition will facilitate diagnostic and prognostic utility of the portable MR sensor described herein.

Example 5: Tuning RF Excitation Frequency Enables Slice Selection

The measurement depth of single-sided MR sensors, including sensor based on the Unilateral Linear Halbach magnet array, is limited due to the rapid decay of the static magnetic field strength away from the surface of the sensor. The sensor has a field strength of approximately 0.28 Tesla and gradient, within the sweet spot, of approximately 1.7 Tesla/m. Noninvasive measurements are easily confounded by proximal, subcutaneous tissue due to limitations in penetration depth.

It was shown herein that tuning the RF excitation frequency of the portable MR sensor allows for spatial selection of the position of the sensitive region. This is demonstrated by measuring the sensitivity of the sensor towards a thin, planar sample as a function of both distance from the sensitive region and RF excitation frequency ($B_1$) (FIG. 10A). A planar sample of an aqueous solution of a paramagnetic species ($CuSO_4$) with a thickness of 380 µm was scanned in front of the sensor. MR measurements via the CPMG pulse sequences were performed over a range of RF excitation frequencies for each depth of the sample. The sensitivity of the system was characterized as the relative signal strength produced by the sample at each depth position and RF excitation frequency. This sensitivity profile varies as a function of depth and exhibits a distinct region of peak sensitivity that is unique to each RF excitation frequency (FIG. 10B). Decreased B1 frequency enables deeper measurements remote from the surface of the sensor. The use of smaller RF excitation frequencies enables localization of the measurement to regions located at a greater distance from the surface of the sensor. The effective slice thickness by a given RF excitation frequency decreases with distance from the sensor at a fixed excitation pulse bandwidth due to the increasing gradient of the static magnetic field (FIG. 10C). It was shown that an RF pulse bandwidth of 0.7% excites slices 0.6 to 1.3 mm thick with slice thickness decreasing with depth. Circles indicate the depth of the peak of each sensitivity profile. Whiskers indicate slice thickness defined as full width at half maximum. The sensitivity decreases with increased depth due to increased attenuation of the RF field produced by the transceiver coil. Tuning the RF excitation pulse frequency offers control over the fraction of proximal versus more distal tissue in the acquired signal. This capability enables targeting of the measurement towards a tissue of interest, e.g., the liver.

Example 6: Depth Sensitivity Profile and Tissue Fraction Estimation Improved Measurement Localization Estimation of proximal tissue thickness with the portable MR sensor was demonstrated. Synthetic tissue phantoms mimicking the relaxation properties of human tissues were fabricated via aqueous solutions with varying concentrations of a paramagnetic species ($CuSO_4$). The phantoms were designed to fully span the sensitive region of the sensor. Synthetic tissue phantoms were fabricated from PEEK film (0.005-inch thickness) and nylon annular rings with an inner diameter of 6 mm and thickness of 1, 1.3, 1.5, and 3 mm with a tolerance of 0.3 mm. Each nylon ring was first bonded to a disk of PEEK film of identical outer diameter. The resultant cylindrical cavity was filled with fluid mimicking the MR relaxation properties of subcutaneous fat (i.e. soybean oil, $CuSO_4$). Then a second disk of PEEK film was used to seal each phantom.

Figure 12A:
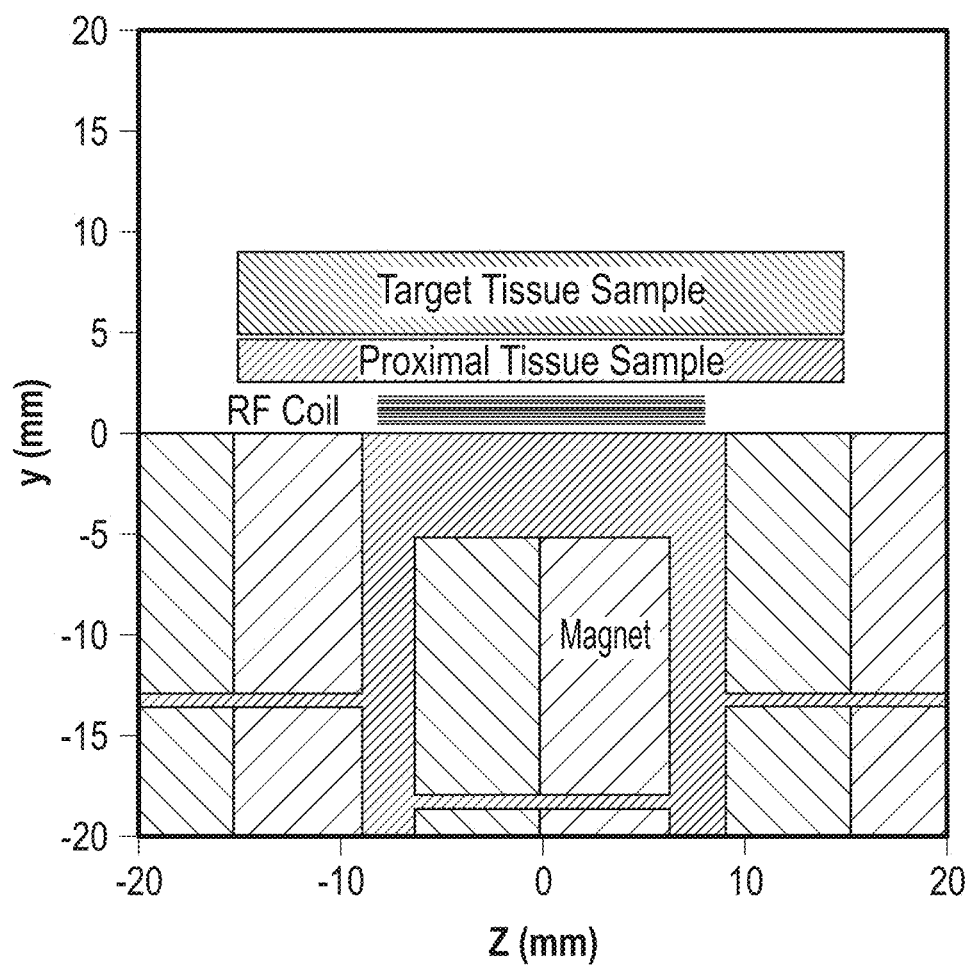
FIGS. 12A-12D illustrate an estimation of proximal subcutaneous tissue thickness via portable MR sensor, according to one example.
Figure 13A:
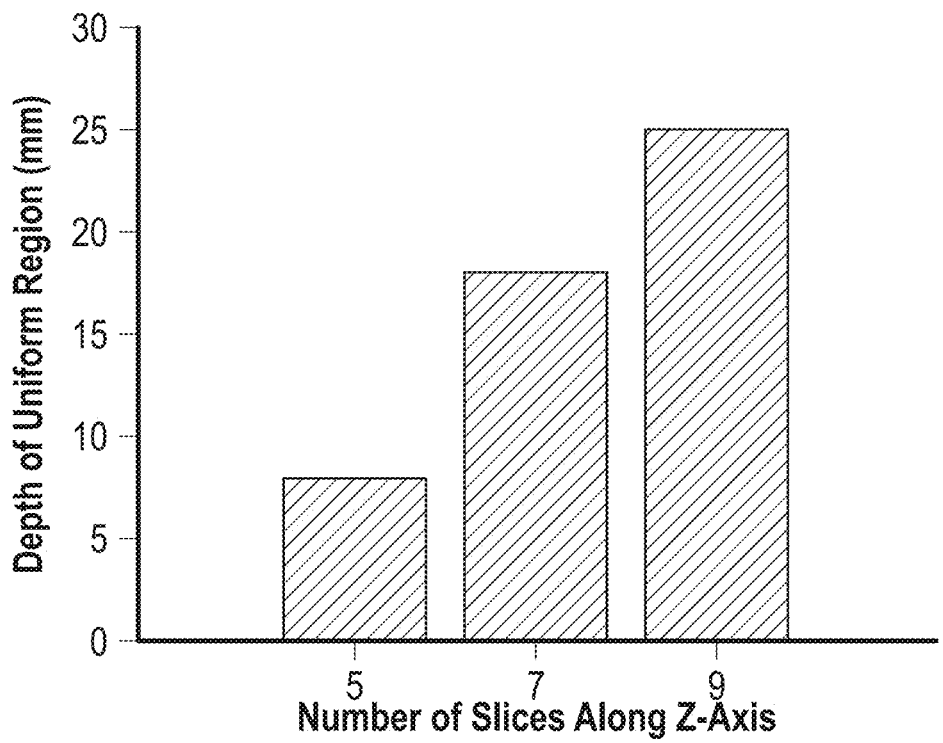
FIGS. 13A-13C depict simulations of alternative single-sided magnet designs, according to some examples. The effects of increasing the number of slices along the z-axis (FIG. 13A), the magnet slice gap along the z-axis (FIG. 13B), and the middle slice drop along the y-axis versus the depth of the uniform region of the magnetic field (FIG. 13C), are shown.
Figure 13B:
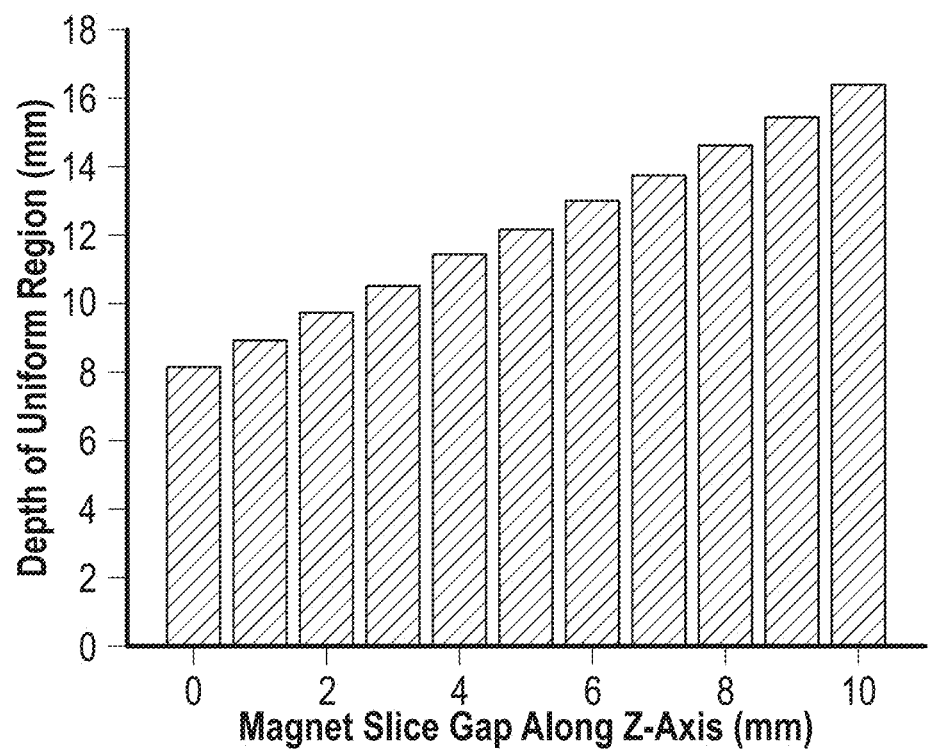
Figure 13C:
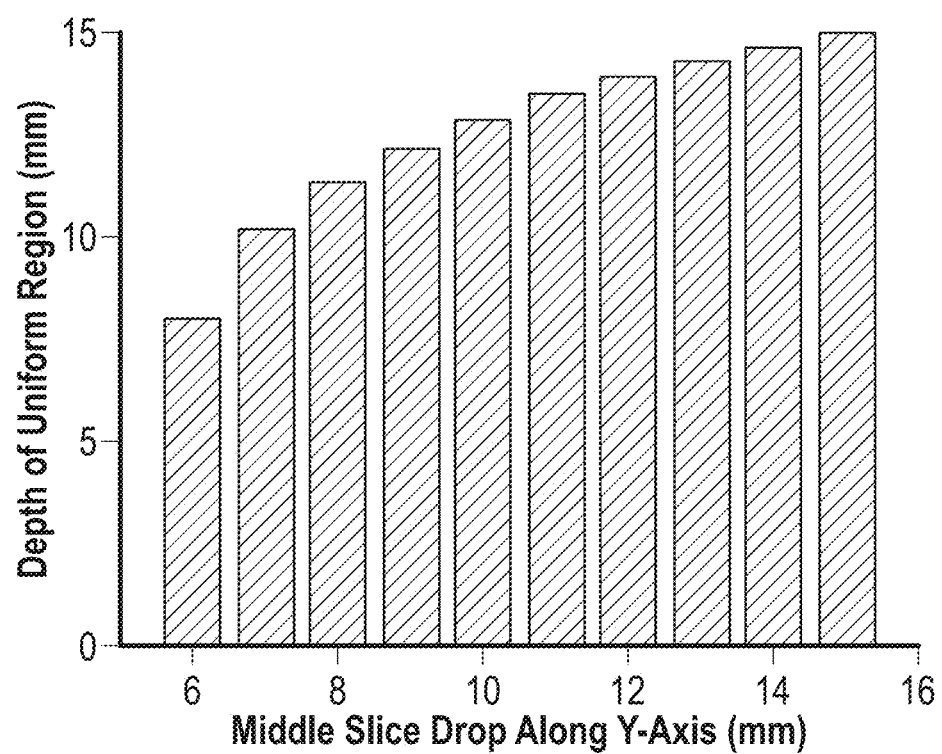

The phantoms were then arranged with the proximal tissue directly in contact with the RF coil of the portable MR sensor and the target tissue placed against the proximal tissue phantom (FIG. 12A). The thickness of the proximal tissue was varied (1, 1.3, 1.5, and 3 mm) to mimic natural variability both within and between patients. Each configuration of phantoms was measured with the CPMG pulse sequence with six unique RF excitation frequencies. Portable MR sensor measurements were performed with the CPMG pulse sequence with the following parameters common to all scans: 8192 echoes, 1 dummy echo, an echo time of 65 µs, a measurement time of 1065 ms, a repetition time of 1517 ms, a pulse duration of 12 µs, an acquisition bandwidth of 1 MHz (dwell time of 1 µs), and 16 acquired points per echo. RF excitation frequencies of 11.43, 11.53, 11.58, 11.66, 11.73, and 11.83 MHz were acquired.

Figure 12B:
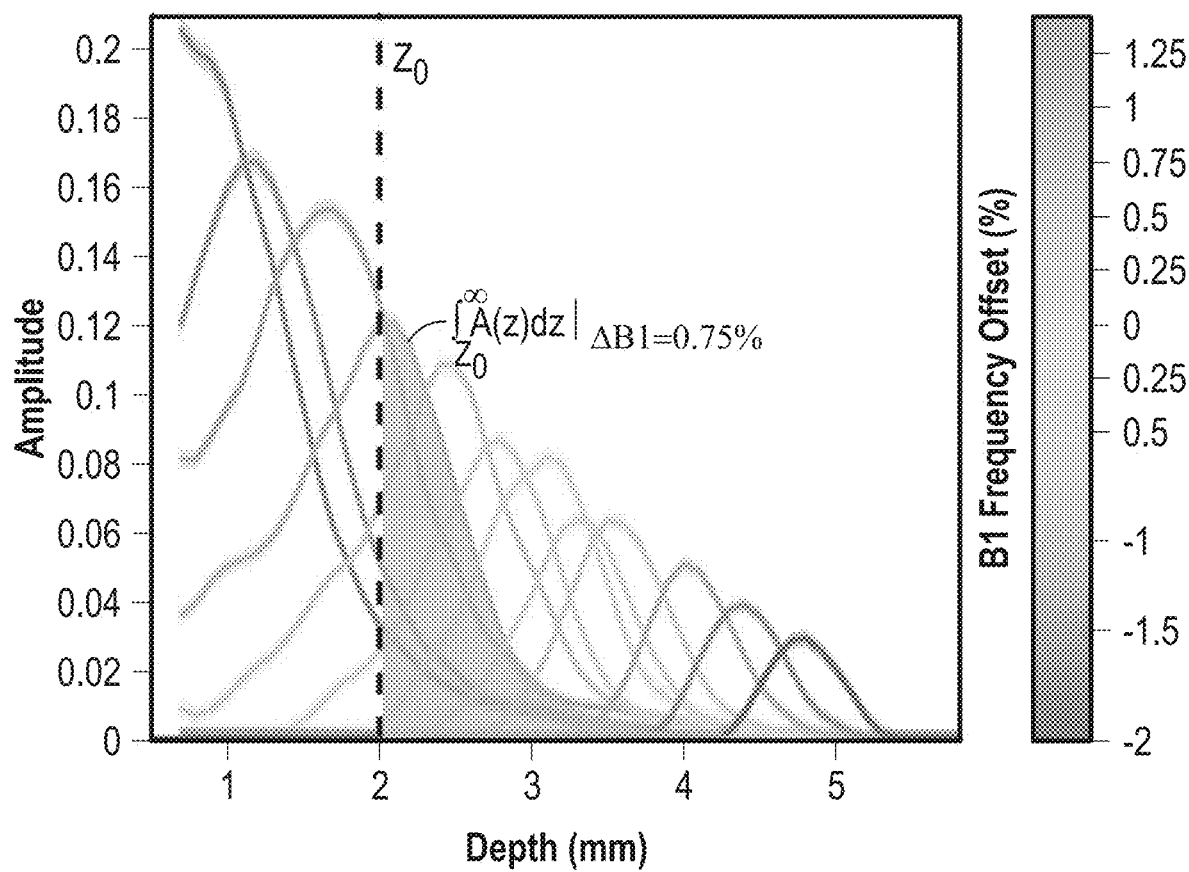
Figure 12C:
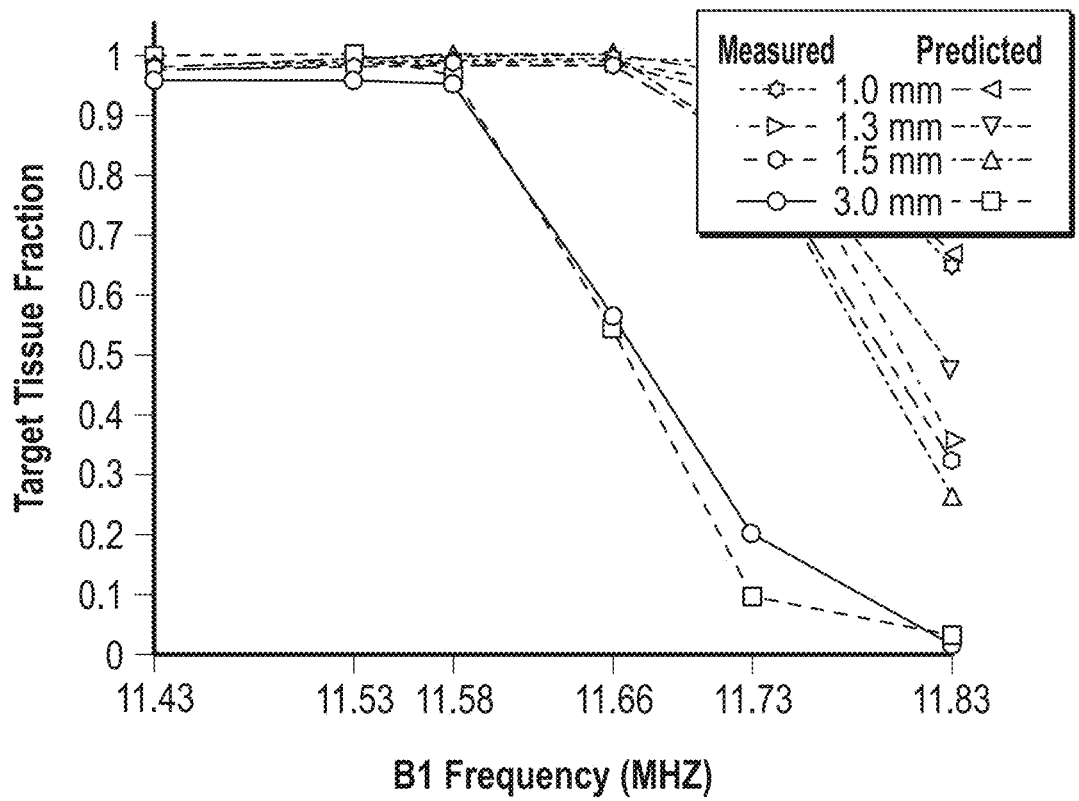

The expected signal amplitude originating from the distal tissue for a given proximal tissue thickness (e.g., 2 mm) can be estimated as the integral of the sensor sensitivity profile taken across the expected depth of the target tissue (e.g. greater than 2 mm) for each RF excitation frequency (FIG. 12B). This can be converted to an estimate of the target tissue fraction by dividing it by the integral of the entire sensitivity profile at the given RF excitation frequency. This technique can be used to precisely quantify proximal tissue thickness. Estimates of target tissue fraction from experimentally acquired signals show strong agreement with estimated target tissue fractions for the same proximal thickness across a wide range of RF excitation frequencies. (FIG. 12C)

Figure 12D:
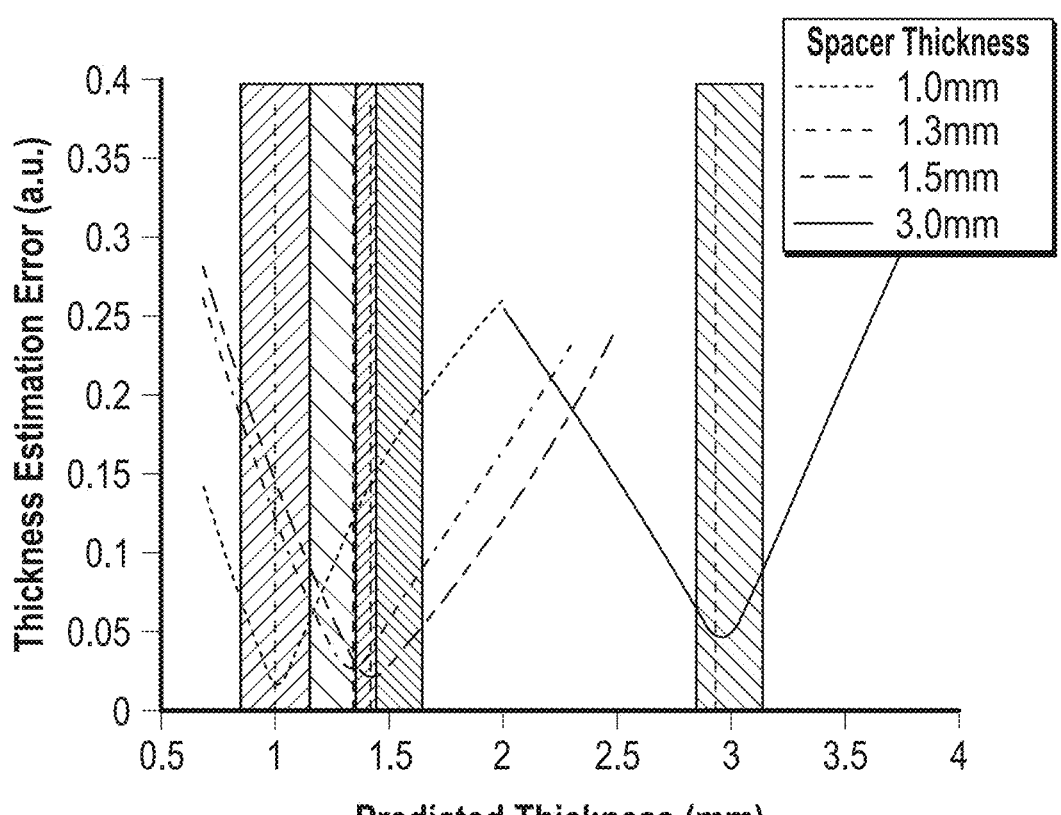

Sensor sensitivity as a function of depth can be used for precise estimation of the thickness of a proximal tissue. The tissue fractions generated by integrating the sensitivity profiles for a candidate thickness can be compared with tissue fractions from experimentally acquired signals. Optimal candidate thickness was identified by minimizing the error between proximal tissue fraction estimates and those from the measured signal (FIG. 12D). Dotted vertical lines indicate the estimated proximal tissue thickness, corresponding to the minima of each error curve. Shaded regions indicate 0.3 mm uncertainty in the true thickness of each proximal tissue layer. This optimal thickness represents the actual thickness of each phantom.

An algorithm to perform acquisition at the optimal RF excitation frequency can be implemented by utilizing this method. The optimal RF excitation frequency would be sufficiently low as to ensure a significant fraction of the sensitive region is located within the target tissue without being so low as to unnecessarily sacrifice sensitivity. This optimal frequency would be dependent on the proximal tissue thickness, geometry of the portable MR sensor, and pulse parameters (e.g. excitation pulse bandwidth). Estimation of the optimal RF excitation frequency is made more robust and accurate by performing measurements of a tissue geometry at multiple RF excitation frequencies.

Example 7: Varying Echo Time Enabled Sensitivity Towards Sample Diffusivity

Distinct tissues can have very similar relaxation properties (e.g., times and amplitudes) making identification and further characterization of changes in relaxation properties difficult. Measurements of relaxation properties via CPMG are inherently affected by the diffusivity of spins (e.g. water in tissue) within the sample. Here it was demonstrated that explicitly manipulating the echo time within CPMG allows control over the effect of diffusivity on the relaxation properties of the signal with our portable MR sensor.

Varying the echo time between excitation and subsequent refocusing pulses provided control over the magnitude of signal attenuation induced by sample diffusivity. Signal attenuation between sequential refocusing pulses in CPMG is driven by both T2 decay and the motion of spins within the magnetic field. The T2 decay term is proportional to the echo time, while the diffusion term is proportional to the echo time cubed. Therefore, by controlling the echo time, the relative signal attenuation due to each factor can be varied.

Four aqueous solutions of polyethylene glycol (PEG) and gadolinium were prepared with identical T2 relaxation time and distinct diffusion coefficients. PEG concentration primarily affected the diffusivity of water, while gadolinium primarily affected relaxation properties. T2 relaxation times were estimated via measurements on a benchtop NMR spectrometer via CPMG. The time domain signals and T2 relaxation times, estimated via a monoexponential fit, were nearly identical across all samples (not shown). The diffusivity of water within the samples, estimated via pulsed gradient spin echo pulse sequence on a Bruker NMR spectrometer, varied significantly with PEG concentration.

Measurements of the aqueous solutions were performed with CPMG with varying echo time with the portable MR sensor. The change in decay rate in the time domain and estimated relaxation time extracted from a monoexponential fit of each sample differed as a function of echo time. Increased echo time led to a decrease in relaxation time. The magnitude of this decrease was more pronounced with increased sample diffusivity. The relative change in relaxation time as a function of echo time clearly stratifies samples by diffusivity.

Sensitivity towards diffusivity was demonstrated with the portable MR sensor by taking advantage of its highly inhomogeneous static magnetic field. This measurement was performed by varying the echo time which serves a similar purpose as the switchable gradient fields found in more traditional implementations of diffusion-weighted pulse sequences. The relatively high static magnetic field inhomogeneity, a characteristic of most single-sided MR sensors, enables strong diffusion weighting to be achieved with relatively short echo times. The dependency of relaxation time on both echo time and sample diffusivity can be used to identify the T2 and diffusivity of a sample.

Example 8: Computational Modeling of Single Sided MR Sensor Designs

A sensor suitable for use in an in vivo human clinical diagnostic setting would require additional penetration depth beyond that provided by the MR sensor used in the examples here. Therefore, the potential to modify the existing magnet design was explored to increase the penetration depth of the Unilateral Linear Halbach array while only partially compromising portability. Numerical modeling was performed to simulate the magnetic field profile generated by Unilateral Linear Halbach magnet. The magnet array was parameterized, as previously described, by the side length of each magnet, number of slices in each direction, the gap between the slices in each direction, and the amount of vertical translation (i.e. drop along the y-axis) applied to the middle slice.

Simulations were first performed with an increased number of slices of magnets oriented perpendicular to the z-axis. Simulations began with 5 magnets, as were used in the sensor described here in these examples, before additional magnets were added up to a total of 9 magnets oriented along the z-axis. The penetration depth can be increased by a factor of 3.1-fold with only a 1.8-fold increase in the mass of the sensor (FIG. 13A).

Simulations were then performed where the gap between magnet slices along the z-axis was varied. These simulations demonstrate that when this gap is increased from 2 mm to 10 mm, the depth of the uniform region increases by nearly two-fold up to 16 mm in the tested configuration (FIG. 13B). This trend is expected to continue based on the nearly linear relationship between this gap and depth of the uniform region across the tested range. Increasing the gap between the magnets offers a path to increased measurement penetration depth without increasing the mass of the magnets used within the sensor.

Finally, in simulations where the amount of drop applied to the middle slice relative to those adjacent to it was increased from 6 to 15 mm, the depth of the uniform region increased by 87% (FIG. 13C). This was achieved with only a 20% drop of the magnetic field strength at the center of the uniform region. Similarly to the previous experiment, no additional magnetic mass is introduced.

In summary, three potential paths towards increasing the penetration depth of the sensor were identified by through simple modifications to the magnet configuration. It is expected that combining these approaches would yield a sensor with a penetration depth more optimized for use as a clinical diagnostic, e.g., for the liver in a human patient. Further, the penetration depth and volume of the sensitive region could be increased without compromising magnetic field strength by simply linearly scaling the entire sensor.

Additional Details of the Materials and Methods of the Examples

Animals

Animals used in the study were male C57BL/6NCrl mice 6-7 weeks of age and were provided ad libitum access to standard chow for at least 72 hours prior to the start of experiments to allow for acclimation. Distinct cohorts of mice were placed on one of the following diets for one to forty weeks: L-amino acid defined high fat (60% kcal fat) diet with 0.1% methionine and no added choline (HFAAMCD, Research Diets A06071302), L-amino acid defined high fat (60% kcal fat) diet with normal methionine and choline (HFAA, Research Diets A06071306), L-amino acid defined low fat (10% kcal fat) diet with normal methionine and choline (LFAA, Research Diets A06071314), and standard chow (14% fat) (LF, LabDiet Prolab Isopro RMH 3000 5P76).

The average in vivo MR signal acquisition time was approximately ten minutes (240 averages), and in vivo acquisition did not include respiratory gating.

Discarded Human Liver Model

Human donor livers declined for transplantation were included in this study with informed consent for use of donor organs in research. All donor livers were procured based on the standard technique of in situ cold flush using University of Wisconsin (UW) preservation solution and transported using conventional static cold storage. Multiple wedge liver biopsies were taken from each liver for MR analysis in conjunction with machine perfusion experiments.

Histology and Pathology

Liver samples (mouse, rat, and human) were fixed in 10% neutral buffered formalin for 24 hours, stored in 70% ethanol, processed to paraffin and embedded. Samples were sectioned at 5 μm and stained with either haematoxylin and eosin (H&E) or Sirius Red (SR) at MIT Koch Institute Histology Core Facility. Images were acquired using Leica Aperio AT2 slide scanner at 20× magnification.

Steatosis was graded on a 0 to 3 scale by evaluating parenchymal involvement at low to medium magnification power (0 for <5% involvement, 1 for 5 to 33%, 2 for 34 to 66%, and 3 for >66%). Fibrosis was graded using Sirius Red slides on a 0 to 4 scale (0 for none, 1 for perisinusoidal or periportal, 2 for perisinusoidal and portal/periportal, 3 for bridging fibrosis, and 4 for cirrhosis). All grading was performed by a pathologist blinded to the identity of each mouse.

Multi-Exponential Fitting

CPMG T2 decay curves were modeled as multiexponential signals in order to extract relaxation times ($\tau_i$) and relative amplitudes ($A_i$). Echo integrals were computed as the sum of the points sampled for each echo during CPMG when more than one point was collected for each echo. A general multicomponent exponential decay signal was represented as:

$$\hat{y}(t, A, \tau) = \sum_{i=1}^{N} A_i * \exp(-t/\tau_i) \qquad \text{Eq. (1)}$$

where $\hat{y}(t)$ is the estimated signal, N is the number of components, A is a vector of amplitudes, and $\tau$ is a vector of corresponding relaxation times. Two models were used to represent the multicomponent nature of these signals in this study. The first optimizes over both the relaxation times and relative amplitudes. The optimal set of parameters is found by minimizing the L2-norm of the residuals between the estimated and the measured signal:

$$A^{opt}, \tau^{opt} = \operatorname*{argmin}_{A,\tau} \|y(t) - \hat{y}(t)\|_2 \qquad \text{Eq. (2)}$$

where $\hat{y}(t)$ is the measured signal and $\|.\|_2$ represents the L2-norm. This model allows discovery of the relaxation times and amplitudes of a multiexponential signal. The second model optimizes only over the amplitudes as the relaxation times are specified as parameters:

$$A^{opt} = \operatorname*{argmin}_{A} \|y(t) - \hat{y}(t, \tau)\|_2 \qquad \text{Eq. (3)}$$

This more constrained model allows the amplitudes to be estimated more accurately and differences between signals to be described solely as amplitude changes. Signal to noise ratio (SNR) was defined as the maximum magnitude value divided by the standard deviation of the noise. The noise distribution was estimated from the residuals of the fit.

Fat Fraction Phantom Fabrication

Fat fraction phantoms were fabricated. Components of the aqueous phase were DI water, sodium benzoate, TWEEN 20, and agar (Sigma Aldrich, St. Louis, Mo., USA). Components of the fat phase were peanut oil and SPAN 80 (Sigma Aldrich).

Portable MR Sensor Design and Construction

The portable MR sensor, designed and constructed in house, consists of a permanent magnet array and RF transceiver coil. The magnet array within the sensor comprised 180 individual N52 (Nd1Fe14B) cube magnets with a side length of 0.5 inch (12.7 mm). The magnets were arranged in a three-dimensional grid with 6×6×5 magnets in the x-, y-, and z-directions, respectively. The spacing between the magnets was 2.23, 0.76, and 2.54 mm in the x-, y-, and z-directions, respectively. The magnets located in the 2nd, 3rd, and 4th slices along the z-direction were oriented with their positive pole facing the positive z-direction. The magnets located in the 1st and 5th slices along the z-direction were oriented with their positive pole facing the negative and positive y-direction, respectively. The magnets located in the 3rd slice along the z-direction are offset by 5.1 mm in the negative y-direction. The magnets were housed within an aluminum housing manufactured with a dimensional tolerance of 0.127 mm. An RF transceiver coil was located on top of the magnet and consisted of an 8-turn solenoid (AWG 32, 202 um wire diameter) wound around a cylindrical PTFE bobbin (16 mm diameter). The coil geometry was selected to maximize the sensitivity of the sensor. Several tightly-wound, solenoid coils with varied diameter and number of turns were tested, and the coil which maximized the signal to noise ratio on a large sample intended to span the entire sensitive region of the sensor was selected. The magnets were enclosed within an aluminum housing for mechanical stability and electric grounding. A Kea2 spectrometer (Magritek, Wellington, New Zealand) generated the CPMG pulse sequence for MR measurements and was connected to the transceiver coil through a two-element L impedance matching circuit.

Portable MR Sensor Characterization

The profile of the static magnetic field of the portable MR sensor was characterized by scanning a Hall probe (HMMT-6J04-VR, Lake Shore Cryotronics) connected to a gaussmeter (Model 475 DSP Gaussmeter) along lines corresponding to the z-axis and y-axis and centered with respect to the top surface of the sensor.

The measurement of initial sensitivity profiles versus depth were performed by scanning a thin, planar sample of aqueous $CuSO_4$ along a line perpendicular to the sensor surface. The sample consisted of a 1 mm×16 mm×32 mm pocket machined into a PEEK (polyether ether ketone) holder filled with aqueous $CuSO_4$. PEEK was used as it produced a negligible MR signal. Measurements were performed with the center of the sample located between 1.35 mm and 7.35 mm from the sensor surface. The surface of the sensor is defined as the top of the RF coil (as opposed to the surface of the magnet).

The measurement of subsequent sensitivity profiles versus depth were performed by scanning a thin, planar sample oriented parallel to the surface of the sensor along a line perpendicular to its surface. The sample consisted of a 380 μm×6 mm×6 mm pocket machined into PEEK stock filled with aqueous solution of $CuSO_4$. Measurements were performed with the center of the sample located between 0.690 mm and 6.59 mm from the surface of the sensor.

Measurements were performed with the CPMG pulse sequence with 2000 echoes, 65 μs echo time, 110 ms repetition time, 1 μs dwell time (1 MHz acquisition bandwidth), 12 μs pulse duration, and 16 acquired points per echo using a Kea2 spectrometer (Magritek, Wellington, New Zealand).

Portable MR Sensor Measurements and Post-Processing

T2 measurements were performed with the portable MR sensor using a CPMG pulse sequence. The sample under study for each experiment was placed in direct contact with the sensor and aligned with the sensitive region (i.e. directly adjacent to the RF transceiver coil). A plastic cap covering the liver during scanning served to minimize the effect of evaporation on the tissue structure. A Kea2 spectrometer (Magritek, Wellington, New Zealand) was responsible for pulse sequence generation. The average in vivo MR signal acquisition time was ten minutes, and in vivo acquisition did not include respiratory gating. Measurements were performed in an unshielded environment without use of a Faraday cage. All data acquired with the portable MR sensor was modelled as a multicomponent exponential decay (Eq. (1)) and fit with the model described in Eq. (2). The resulting time constants, corresponding to distinct compartments, were learned from the fit result and subsequently used in Eq. (3) to quantify relative signal amplitude originating from each compartment.

Statistical Analysis

Differences between groups were assessed via ANOVA with a Tukey-Kramer test used for post hoc multiple comparisons. 95% confidence intervals ($\alpha=0.05$) for all parameter estimates, shown with error bars, in multicomponent exponential fits were computed assuming an asymptotic normal distribution for each estimate.

Depth Sensitivity Characterization

A thin, planar sample was oriented parallel to the surface of the sensor and scanned along a line perpendicular to its surface. The sample consisted of a 380 μm×6 mm×6 mm pocket machined into PEEK stock filled with aqueous solution of a paramagnetic species ($CuSO_4$). PEEK was used as it produced a negligible MR signal. Measurements were performed with the center of the sample located between 0.690 mm and 6.59 mm from the surface of the sensor. The surface of the sensor is defined as the top of the RF coil (as opposed to the surface of the magnet).

Measurements were performed with the CPMG pulse sequence with 2000 echoes, an echo time of 65 μs, a repetition time of 240 ms, a pulse duration of 12 μs, an acquisition bandwidth of 1 MHz (dwell time of 1 μs), and 16 acquired points per echo with a Kea2 spectrometer (Magritek, Wellington, New Zealand). The RF excitation frequency was varied across the following range (11.43, 11.49, 11.54, 11.6, 11.63, 11.66, 11.69, 11.72, 11.75, 11.78, 11.81, and 11.83 MHz) in order to identify changes in sensitivity as a function of RF excitation frequency. The amplitude in a triexponential fit corresponding to the second peak was attributed to the aqueous solution within the planar phantom and used to estimate the relative sensitivity as a function of depth and RF excitation frequency.

Simulations of Estimation Error of Tissue Fraction

A simulation was performed to assess the signal to noise ratio necessary to accurately estimate the fractions of tissues from within a heterogeneous sample. Tissue A was modeled as producing a triexponential signal with relaxation peaks of 3.4 ms, 35.6 ms, and 116.1 ms based on ex vivo scans of subcutaneous tissue. Tissue B was modeled as producing a signal with relaxation peaks of 2.7 ms, 81 ms, and 279 ms. Tissue A to B ratios of 20:80, 50:50, and 80:20 were considered. Signal to noise ratios of each constituent signal of 25, 50, 75, 100, 125, 150, 175, 200, 225, and 250 were considered for a total of 100 pairwise combinations of signal to noise ratios. For each pair of SNRs at each ratio, a synthetic signal at the corresponding SNR was generated based on the relaxation times and amplitudes observed in triexponential fits (Eq. (3)) of ex vivo measurements of isolated tissues (e.g. subcutaneous fat and liver). A resultant hybrid signal was created as the sum of these two signals. Error was computed as the absolute difference of this estimate from the true ratio. 120 trials were performed for each combination of SNRs and ratios.

In Vitro Diffusion Experiments

Samples consisted of aqueous solutions of varying concentrations of gadolinium trichloride (Gd) and polyethylene glycol (PEG) (mw: 4000 g/mol). Four samples (A, B, C, and D) were prepared with 126, 57, 28.5, and 0.17 mM of PEG and 0.42, 0.5, 0.5, and 0.5 mM of Gd, respectively. The relaxation data from the benchtop NMR spectrometer were acquired via CPMG with 25000 echoes, an echo time of 100 μs, a repetition time of 60 seconds, an RF excitation frequency of 19.95 MHz, an excitation pulse duration of 1.9 μs, an inversion pulse duration of 3.8 μs, an acquisition bandwidth of 1 MHz (dwell time of 3 μs), and 1 acquired point per echo with a (minispec mq20, Bruker, USA). The diffusion NMR data was acquired from a Bruker Avance III HD 400 NMR spectrometer with a pulsed gradient spin echo pulse sequence. Estimation of diffusivity was performed with MestReNova v12.0.4 (Mestrelab Software S.L.). The data from the portable MR sensor were acquired with the CPMG pulse sequence with the following parameters common to all measurements: a measurement time of 1.065 sec, an RF excitation frequency of 11.66 MHz, a repetition time of 452 ms, a pulse duration of 12 μs, an acquisition bandwidth of 1 MHz (dwell time of 1 μs), and 16 acquired points per echo. Echo times of 206, 223, 260, 368, 520, 735, and 1040 μs were utilized. All relaxation times were extracted by fitting the decay curves with a monoexponential model.

Modifications and variations of the methods and systems described herein will be obvious to those skilled in the art from the foregoing detailed description. Such modifications and variations are intended to come within the scope of the appended claims.

We claim:

1. A method for staging liver fibrosis in a patient, the method comprising:
   measuring, using one or more RF coils and a processor, a depth-resolved diffusion-weighted, multicomponent T2 relaxometry signal of the liver or a portion thereof; and
   determining a fibrosis grade of the liver or portion thereof based on the measured diffusion-weighted relaxometry signal, which signal correlates with true fibrosis and differs among liver fibrosis grades.

2. The method of claim 1, further comprising diagnosing, based at least in part on the fibrosis grade, at least one of: liver cirrhosis, hepatitis, alcoholic liver disease, or cholangitis, in the patient.

3. The method of claim 1, wherein the measuring comprises use of one or more permanent magnets configured to enable a single-sided NMR measurement.

4. The method of claim 3, wherein the one or more permanent magnets comprise a unilateral linear Halbach array of permanent magnets.

5. The method of claim 1, wherein the patient is a human.

6. The method of claim 1, further comprising diagnosing, based at least in part on the fibrosis grade, at least one of: nonalcoholic fatty liver disease (NAFLD) or nonalcoholic steatohepatitis (NASH) in the patient.

7. A system for non-invasive staging of liver fibrosis in a patient, the system comprising:

one or more magnets configured to provide a static magnetic field source;

one or more RF transmitter coils connected to a pulse sequence generator, wherein the one or more RF transmitter coils and the pulse sequence generator are configured to apply a varying magnetic field to liver tissues of the patient;

one or more RF receiver coils configured to detect a magnetic field generated within the liver of the patient; and a signal acquisition and processor system configured to acquire signals from the one or more RF receiver coils and perform a relaxation time (T2) relaxometry measurement, wherein the signal acquisition and processor system is configured to:
use a CPMG pulse sequence to produce MR signals;
decompose the MR signals to identify constituent relaxation times and their corresponding amplitudes; and
use the relaxation times and their corresponding amplitudes to determine the fibrosis grade of the liver of the patient.

8. The system of claim 7, wherein the static magnetic field source is a magnetic field that is uniform, optionally uniform to within 1% field uniformity.

9. The system of claim 7, wherein the RF transmitter coils have a frequency range from 1 MHz to 50 MHz.

10. The system of claim 7, wherein the RF transmitter coils have a frequency range from 100 kHz to 20 MHz.

11. The system of claim 7, wherein the use of the relaxation times and their corresponding amplitudes to determine the fibrosis grade of the liver of the patient comprises determining the difference in amplitude of an extracellular fluid component at a short and a long echo time.

12. The system of claim 7, wherein the one or more magnets comprise a unilateral linear Halbach array of permanent magnets.

13. The method of claim 1, wherein determining the fibrosis grade is based on an amplitude of the measured diffusion-weighted relaxometry signal.

14. A method for non-invasively staging liver fibrosis in human patient, the method comprising:
measuring a diffusion-weighted relaxometry signal of the liver or a portion thereof; and
determining the fibrosis grade of the liver or portion thereof based on the measured diffusion-weighted relaxometry signal,
wherein a portable magnetic resonance sensor generates a CPMG pulse sequence to produce MR signals, the MR signals are decomposed to identify constituent relaxation times and their corresponding amplitudes, and the fibrosis grade of the liver is directly determined using the relaxation times and their corresponding amplitudes.

15. A method comprising:
applying a varying magnetic field to liver tissues of a human patient;
measuring a diffusion-weighted relaxometry signal of the liver; and
using the measured diffusion-weighted relaxometry signal from the liver to differentiate among fibrosis grades and between NAFLD and NASH in the patient,
wherein MR signals are decomposed to identify constituent relaxation times and their corresponding amplitudes, and differences in amplitude of an extracellular fluid component in the liver tissues at short and long echo times are determined.

16. The method of claim 14, wherein the amplitudes are associated with an extracellular fluid component at a short and long echo time.

* * * * *